US012591862B2

(12) United States Patent
Miller et al.

(10) Patent No.: US 12,591,862 B2
(45) Date of Patent: Mar. 31, 2026

(54) SYSTEM AND METHOD FOR PROVIDING PAIRINGS FOR LIVE DIGITAL INTERACTIONS

(71) Applicant: Tinder LLC, Dallas, TX (US)

(72) Inventors: Kyle Garrett Miller, Hermosa Beach, CA (US); Joshua David Gafni, West Hollywood, CA (US); Danielle Mariah Zegelstein, Bedford, NY (US)

(73) Assignee: Tinder LLC, Dallas, TX (US)

( * ) Notice: Subject to any disclaimer, the term of this patent is extended or adjusted under 35 U.S.C. 154(b) by 0 days.

(21) Appl. No.: 18/519,379

(22) Filed: Nov. 27, 2023

(65) Prior Publication Data

US 2024/0161208 A1     May 16, 2024

Related U.S. Application Data

(63) Continuation of application No. 17/093,860, filed on Nov. 10, 2020, now Pat. No. 11,830,086.

(51) Int. Cl.
| | |
|---|---|
| *G06Q 50/00* | (2024.01) |
| *G06Q 30/0282* | (2023.01) |
| *H04L 51/046* | (2022.01) |
| *H04L 67/50* | (2022.01) |

(52) U.S. Cl.
CPC ......... *G06Q 50/01* (2013.01); *G06Q 30/0282* (2013.01); *H04L 51/046* (2013.01); *H04L 67/535* (2022.05)

(58) Field of Classification Search
None
See application file for complete search history.

(56) References Cited

U.S. PATENT DOCUMENTS

| | | | | |
|---|---|---|---|---|
| 7,885,902 B1 * | 2/2011 | Shoemaker | ............ | G06Q 50/01 705/1.1 |
| 9,117,180 B1 | 8/2015 | Chiu et al. | | |
| 10,984,488 B1 * | 4/2021 | Colucci | ................. | G06Q 50/01 |
| 2008/0154899 A1 * | 6/2008 | Carmony | ............... | G16H 10/60 |
| 2011/0125783 A1 | 5/2011 | Whale et al. | | |
| 2011/0138305 A1 * | 6/2011 | Akai | ...................... | G06Q 30/08 715/753 |

(Continued)

FOREIGN PATENT DOCUMENTS

| | | |
|---|---|---|
| KR | 20180001155 A | 1/2018 |

OTHER PUBLICATIONS

G. Tyson, V. C. Perta, H. Haddadi and M. C. Seto, "A first look at user activity on Tinder," 2016 IEEE/ACM International Conference on Advances in Social Networks Analysis and Mining (ASONAM), 2016, pp. 461-466, doi: 10.1109/ASONAM.2016.7752275. (Year: 2016).*

(Continued)

*Primary Examiner* — Laura Yesildag
(74) *Attorney, Agent, or Firm* — Baker Botts L.L.P.

(57) ABSTRACT

A system includes a processor and an interface coupled to the processor. The processor determines that a first user takes a first action, and determines to pair the first user and a second user. The processor pairs the first user and the second user for an interaction, where the interaction lasts for a first time period. The interface receives an indication of a preference of the first user for the second user at a second time. The second time is after the first time period.

51 Claims, 10 Drawing Sheets

(56)  References Cited

U.S. PATENT DOCUMENTS

| | | | | |
|---|---|---|---|---|
| 2014/0040368 | A1* | 2/2014 | Janssens | H04L 67/306 |
| | | | | 709/204 |
| 2014/0108308 | A1 | 4/2014 | Stout et al. | |
| 2016/0154808 | A1 | 6/2016 | Ayodele | |
| 2017/0228819 | A1* | 8/2017 | Shenkar | G06Q 40/03 |
| 2018/0053261 | A1* | 2/2018 | Hershey | G06Q 50/01 |
| 2019/0036851 | A1 | 1/2019 | Yaghmai et al. | |
| 2019/0121830 | A1 | 4/2019 | Maxwell et al. | |
| 2019/0147366 | A1 | 5/2019 | Sankaran et al. | |
| 2019/0156347 | A1 | 5/2019 | Frosst | |
| 2019/0349323 | A1 | 11/2019 | Evnine et al. | |
| 2020/0009462 | A1 | 1/2020 | Hall et al. | |
| 2020/0082350 | A1 | 3/2020 | Aagaard et al. | |
| 2021/0082063 | A1* | 3/2021 | Miller | H04L 67/52 |
| 2021/0109938 | A1* | 4/2021 | LaPoff | G06Q 50/01 |
| 2021/0224346 | A1 | 7/2021 | Peng et al. | |

OTHER PUBLICATIONS

L. Cabrera-Quiros, A. Demetriou, et al. "The MatchNMingle Dataset: A Novel Multi-Sensor Resource for the Analysis of Social Interactions and Group Dynamics In-the-Wild During Free-Standing Conversations and Speed Dates," in IEEE Transactions on Affective Computing, vol. 12, No. 1, pp. 113-130, 2018 (Year: 2018).*

P. Xia, B. Liu, Y. Sun and C. Chen, "Reciprocal recommendation system for online dating," 2015 IEEE/ACM International Conference on Advances in Social Networks Analysis and Mining (ASONAM), Paris, France, 2015, pp. 234-241, doi: 10.1145/2808797.2809282. (Year: 2015).*

Levy, Jon et al. "Polar Similars: Using Massive Mobile Dating Data to Predict Synchronization and Similarity in Dating Preferences." Frontiers in Psychology vol. 10 2010. Sep. 6, 2019, doi: 10.3389/fpsyg.2019.02010. (Year: 2010).*

PCT Notification of Transmittal of the International Search Report and the Written Opinion of the International Searching Authority, or the Declaration; Int'l Application No. PCT/US2021/072236; dated Feb. 16, 2022.

G. Tyson et al., "A first look at user activity on Tinder," 2016 IEEE/ACM International Conference on Advances in Social Networks Analysis and Mining (ASONAM), 2016, pp. 461-466, doi: 10.1109/ASONAM.2016.7752275. (Year: 2016).

L. Cabrera-Quiros et al. "The MatchNMingle Dataset: A Novel Multi-Sensor Resource for the Analysis of Social Interactions During Free-Standing Conversations and Speed Dates," in IEEE Transactions on Affective Computing, vol. 12, No. 1, pp. 113-130, 2018 (Year: 2018).

Levy, Jon et al. "Polar Similars: Using Massive Mobile Dating Data to Predict Synchronization and Similarity in Dating Preferences", Frontiers in Psychology, vol. 10 2010, Sep. 6, 2019; doi: 10.3389/fpsyg.2019.02010. (Year: 2019).

Tu, Kun et al. "Online dating recommendations: matching markets and learning preferences", Proceedings of the 23rd international conference on world wide web. 2014 (Year: 2014).

P. Xia et al., "Reciprocal recommendation system for online dating", 2015 IEEE/ACM International Conference on Advances in Social Networks Analysis and Mining (ASONAM), Paris, France, 2015, pp. 234-241, doi: 10.1145/2808797.2809282. (Year: 2015).

R. Nayak et al., "A Social Matching System for an Online Dating Network: A Preliminary Study," 2010 IEEE International Conference on Data Mining Workshops, Sydney, NSW, Australia, 2010, pp. 352-357, doi: 10.1109/ICDMW.2010.36. (Year: 2010).

A. Kazemi et al., "Finding Compatible People on Social Networking Sites, a Semantic Technology Approach," 2011 Second International Conference on Intelligent Systems, Modelling and Simulation, Phnom Penh, Cambodia, 2011, pp. 306-309, doi: 10.1109/ISMS.2011.54 (Year: 2011).

X. Zang et al., "You Will Succeed or Not? Matching Prediction in a Marriage Consulting Service," 2017 IEEE Third International Conference on Multimedia Big Data (BigMM), Laguna Hills, CA, USA, 2017, pp. 109-116, doi: 10.1109/BigMM.2017.11. (Year: 2017).

* cited by examiner

SYSTEM AND METHOD FOR PROVIDING PAIRINGS FOR LIVE DIGITAL INTERACTIONS

RELATED APPLICATIONS

This nonprovisional application is a continuation, under 35 U.S.C. § 120, of U.S. patent application Ser. No. 17/093,860 filed on Nov. 10, 2020 and entitled "System and Method for Providing Pairings for Live Digital Interactions" all of which is hereby incorporated by reference in its entirety.

TECHNICAL FIELD

This invention relates generally to the field of communications and, more particularly, to a system and method for providing pairings for live digital interactions.

BACKGROUND

Networking architectures, developed in communications environments, have grown increasingly complex in recent years. A multitude of protocols and configurations have been developed to accommodate a diverse group of end users having various networking needs. Many of these architectures have gained significant notoriety because they can offer the benefits of automation, convenience, management, and enhanced consumer selections. Using computing platforms with the networking architectures has allowed for increased communication, collaboration, and/or interaction. For example, certain network protocols may be used to allow an end user to connect online with other users who satisfy certain search requirements. These protocols may relate to job searches, person finding services, real estate searches, or online dating.

SUMMARY

According to an embodiment, a system includes a processor and an interface coupled to the processor. The processor determines that a first user takes a first action, and determines to pair the first user and a second user. The processor pairs the first user and the second user for an interaction, where the interaction lasts for a first time period. The interface, at a second time, receives an indication of a preference of the first user for the second user. The second time is after the first time period.

According to another embodiment, a method includes determining, by a processor, that a first user takes a first action. The method further includes determining, by the processor, to pair the first user and a second user. The method also includes pairing, by the processor, the first user and the second user for an interaction, the interaction lasting for a first time period. At a second time, the method includes receiving, by an interface, an indication of a preference of the first user for the second user. The second time is after the first time period.

According to one embodiment, at least one computer-readable medium comprising a plurality of instructions that, when executed by at least one processor, are configured to determine that a first user takes a first action. The plurality of instructions are further configured to determine to pair the first user and a second user and pair the first user and the second user for an interaction lasting for a first time period. At a second time, the plurality of instructions are further configured to receive an indication of a preference of the first user for the second user. The second time is after the first time period.

Certain embodiments provide one or more technical advantages. For example, an embodiment may allow users to interact and engage with each other before viewing profiles of users, to determine preference indications earlier in the meeting process, thereby decreasing the processing and bandwidth resources expended by users gathering and reviewing information about another user before an interaction with him or her. As another example, an embodiment may incorporate user feedback information into a machine-learning recommendation algorithm, thereby providing enhanced recommendations for users and accordingly decreasing the processing and bandwidth resources expended by the system in providing recommendations to a user. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
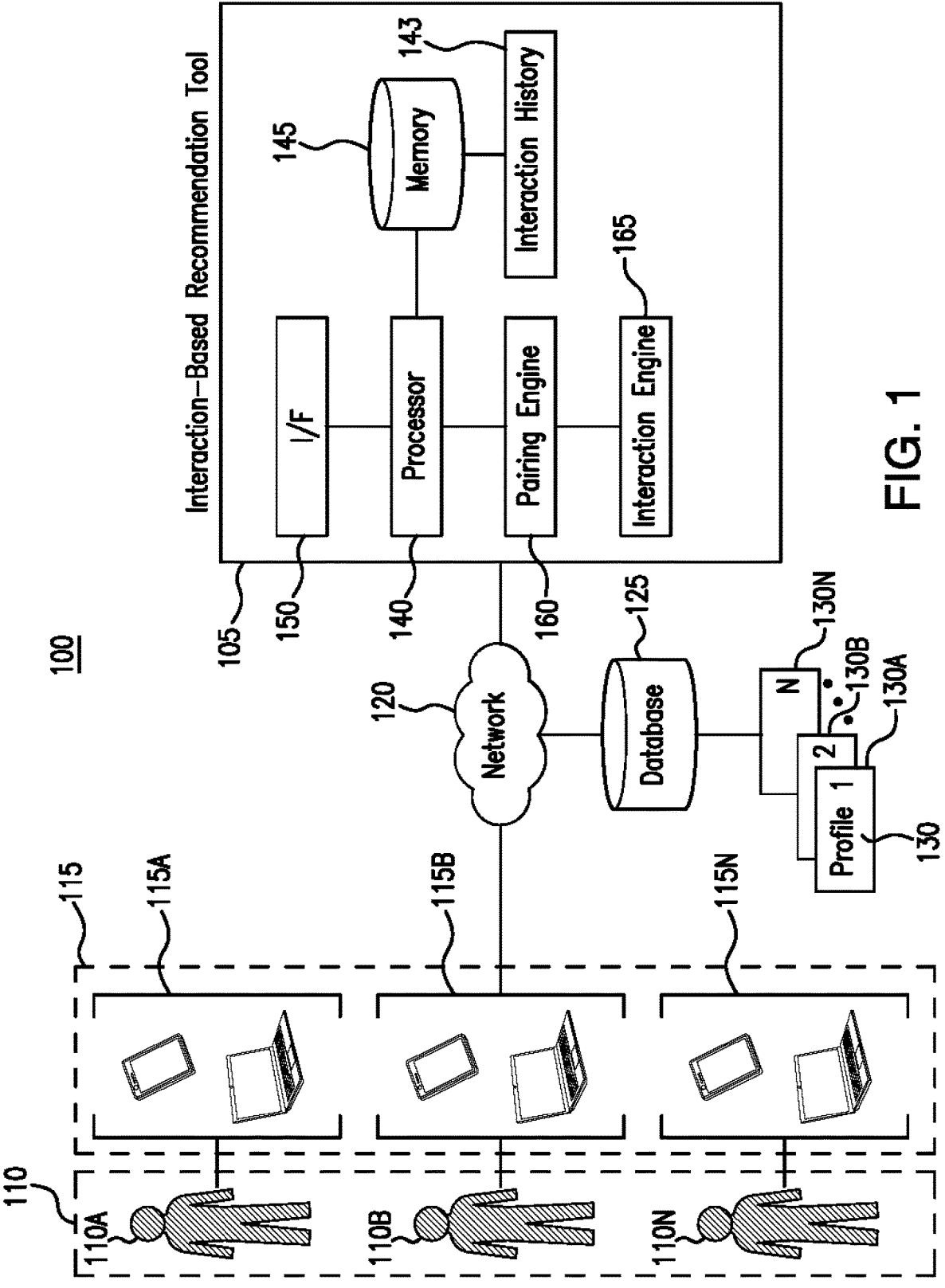
FIG. 1 illustrates an example system.

Embodiments of the present disclosure and its advantages may be understood by referring to FIGS. 1 through 4 of the drawings, like numerals being used for like and corresponding parts of the various drawings.

In a typical online-matching system, users view profiles of other users that include particular sets of attributes related to those users and may be used to facilitate connections. As an example, in the online-dating context, the profiles might include attributes such as age, education, and interests. Users may review profiles of other users to determine whether those users have characteristics that they like, and the system determines whether to connect them for further engagement. For example, a conventional system will only allow users to interact after each has expressed a positive preference for the other based only on the other's profiles, rather than an actual interaction or conversation.

This connection process may require a significant wait time because users are not necessarily viewing each other's profiles at the same time. For example, a first user may indicate a positive preference for the second user one day, and the second user might not even view the first user's profile until a few days later. Even if the second user indicates a positive preference for the first user as soon as he or she views the first user's profile, there has been a delay for the first user. The second user may no longer be top of mind for the first user, and the first user might now have less interest in connecting and engaging with the second user. Also, a user's profile may not provide details and nuances of the user's personality. While a user may provide important profile information such as interests, location, age, and preferences, it does not necessarily allow another user to get a sense of who they are as a person and how the two would interact.

This disclosure contemplates an interaction-based recommendation tool that addresses one or more of the above issues. Of the users who are currently using the system, the interaction-based recommendation tool pairs two or more users who may be compatible, allowing them to interact before the system has matched them based on their positive preference indications for the other. After a live interaction, the tool presents the users with options to provide a preference indication for the other. If both provide a positive preference indication for the other, then the tool matches the users and allows them to connect and engage further. By allowing the users to interact while both using the system, it creates a concurrent experience and immediate conversation before requiring preference indications. By bringing these interactions to the beginning of the process, there is a greater chance for the users to have conversations without a wait time and to engage with a larger number of users. This also allows users to lead with their personalities in these interactions, rather than relying solely on a profile to receive matches.

Based on the user's choices, the interactions may provide opportunities and prompts to help them engage in conversation. For example, the interaction may be timed to entice the users to respond quickly and have more back-and-forth quickly. The interaction may provide some sort of question, prompt, game, or activity so the users may interact while performing an activity to spark conversation or provide an opportunity to have a shared experience. By allowing users to interact and have a concurrent experience, this interaction-based recommendation tool provides immediate connections to users and can recommend and pair other users based on these interactions.

FIG. 1 illustrates example system 100. As seen in FIG. 1, system 100 includes interaction-based recommendation tool 105, user(s) 110, device(s) 115, network 120, and database 125. Generally, interaction-based recommendation tool 105 determines that users 110 take actions in system 100 and determines users (e.g., user 110A and 110B) to pair together for an interaction. Interaction-based recommendation tool 105 may pair together any number of users, such as two users, a group of three or more users, two or more groups of two or more users, one large group of users, and/or any combination of users. After the interaction, interaction-based recommendation tool 105 receives preference indications for the users and then indicates if the users have both expressed a positive preference indication for the others. Interaction-based recommendation tool 105 may rely on various parameters to determine that users 110 should be paired together for an interaction. For example, interaction-based recommendation tool 105 may analyze information such as user 110A's interaction history with other users 110, profile information of users 110 (e.g., interests, likes, dislikes, preferences, matches, past pairings, activity), or any other suitable information. Interaction-based recommendation tool 105 may also provide different types of interactions for users 110. For example, interaction-based recommendation tool 105 may provide an interaction that is timed, where users 110 may send messages (e.g., for a time period or certain amount), an activity, a game, a cooperative experience, or any suitable interaction for users 110.

Devices 115 include any appropriate device for communicating with components of system 100 over network 120.

For example, device 115 may be or may be accompanied by a telephone, a mobile phone, a computer, a laptop, a tablet, a server, an automated assistant, and/or a virtual reality or augmented reality headset or sensor, or other device. This disclosure contemplates device 115 being any appropriate device for sending and receiving communications over network 120. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein. In certain embodiments, devices 115 may communicate with interaction-based recommendation tool 105 through network 120 via a web interface. In some embodiments, an application executed by device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication among the components.

Database 125 stores a set of user profiles 130. User profiles 130 define or represent features of users 110. Profiles 130 may be available to the general public, to those that are members of the online dating system, and/or to a specific category of those members of the online dating system. Profiles 130 may contain information that was solicited from users 110 when users 110 set up their online dating accounts or was otherwise input by such users into their profiles. Profiles 130 may include general information such as age, height, gender, and occupation, as well as detailed information that may include the users' interests, likes/dislikes, personal feelings, and/or outlooks on the world. In some embodiments, interaction-based recommendation tool 105 may review profiles 130 to determine which users 110 to pair. In some embodiments, interaction-based recommendation tool 105 may operate on, change, remove, or add information to profiles 130 that have been stored in database 125. In some embodiments, this may be based on an interaction among users 110.

As seen in FIG. 1, interaction-based recommendation tool 105 includes processor 140, memory 145, and interface 150. This disclosure contemplates processor 140, memory 145, and interface 150 being configured to perform any of the functions of interaction-based recommendation tool 105 described herein.

Processor 140 may be any electronic circuitry, including, but not limited to microprocessors, application specific integrated circuits (ASIC), application specific instruction set processor (ASIP), or state machines, that communicatively couples to memory 145 and interface 150 and controls the operation of matching tool 105. Processor 140 may be 8-bit, 16-bit, 32-bit, 64-bit, or any other suitable architecture. Processor 140 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 140 may include other hardware and software that operates to control and process information. Processor 140 executes software stored on memory 145 to perform any of the functions described herein. Processor 140 controls the operation and administration of interaction-based recommendation tool 105 by processing information received from network 120, device(s) 115, interface 150, and memory 145. Processor 140 may be a programmable logic device, a microcontroller, a microprocessor, any suitable processing device, or any suitable combination of the preceding. Processor 140 is not limited to a single processing device and may encompass multiple processing devices.

Memory 145 may store, either permanently or temporarily, data, operational software, or other information for processor 140. Memory 145 may include any one or a combination of volatile and non-volatile local or remote devices suitable for storing information. For example, memory 145 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 140 to perform one or more of the functions described herein.

In certain embodiments, memory 145 may also store interaction history 143. Interaction history 143 may include data regarding past or current interactions between and/or among users 110. For example, user 110A and user 110B may have had a digital interaction last week where they sent a few messages back and forth. As another example, user 110A and user 110B may have had an interaction a year ago where they played a game together. Interaction history 143 may store any information about the interaction, including date, time, duration of the interaction, substance of the interaction, type of interaction (e.g., conversation, games, video, group discussion, event), submission of preferences after an interaction, or any other piece of data about or relating to the interaction. Each user 110 may have a corresponding interaction history 143 indicating information relating to interactions that user has had. In some embodiments, pairing engine 160 analyzes interaction history 143 to determine whether users should be paired together for an interaction. In some embodiments interaction history 143 may include data regarding interactions among users 110 and interaction-based recommendation tool 105, among users 110 and network 120, among users 110 and user devices 115, and/or any other interactions in system 100. For example, interaction history 143 may include data about whether user 110 has used a certain feature related to interaction-based recommendation tool 105 or a related tool (e.g., games, profile viewing, live digital experiences, messaging, chatting, surveys), whether user 110 is a subscriber or subscribes to interaction-based recommendation tool 105 or a related tool, whether user 110 pays for certain functionality, preferences of user 110, or any other data related to user 110. As another example, a subscriber or user 110 who pays a fee may receive priority in pairing, such as waiting less time to be paired, being paired with the first available user, and/or being paired with a highly rated user.

Interface 150 represents any suitable device operable to receive information from network 120, transmit information through network 120, perform suitable processing of the information, communicate to other devices, or any combination of the preceding. For example, interface 150 transmits notifications to devices 115. As another example, interface 150 may facilitate the exchange of messages during an interaction among users 110, for example, by receiving a message transmitted by user 110A for ultimate receipt by user 110B and then transmitting the message to user 110B. Interface 150 represents any port or connection, real or virtual, including any suitable hardware and/or software, including protocol conversion and data processing capabilities, to communicate through a LAN, WAN, or other communication systems that allows matching tool 105 to exchange information with devices 115 and/or other components of system 100 via network 120.

In some embodiments, interaction-based recommendation tool 105 determines that user 110 takes an action. An action may be any indication that user 110 is active on device 115 within system 100 or available to begin an interaction. For example, user 110A may check messages for another user 110, view profiles 130 of users 110 on device 115, open an application related to interaction-based recommendation tool 105 on device 115. If interaction-based recommendation tool 105 determines that user 110 is active, it may continue and determine whether user 110A should be paired with another user. In some embodiments, an action may be a request to system 100 by user 110A to begin an interaction with another user 110. In this example, user 110A may select a "start now" button, select a type of interaction, answer a question or prompt, or opt-in to interactions generally. In some embodiments, an opportunity to have an interaction with other users 110 may only be available at select times or frequencies. For example, users 110 may only be able to request an interaction at a certain time of day (e.g., happy hour), on certain days (e.g., weekends only), at random intervals, after a certain time has elapsed from a previous interaction, during some large cultural moment (e.g., Super Bowl or Academy Awards), or a certain number of times in a period (e.g., 5 times per day, 1 time per week, 25 times a month). An action may also be user 110 registering with system 100. For example user 110 may have to register by creating a profile, downloading an application to device 115, signing on to a website, configuring a setting to engage in interactions, or any other sign up procedure. In some embodiments, users 110 may be required to be subscribers and/or charged a fee in order to have an opportunity to interaction with other users 110. For example, user 110 may need to pay a monetary amount before engaging in any interactions. As another example, user 110 may only be able to have a certain number of interactions (e.g., 1 per day, 3 per week) and afterwards must pay a fee for each interaction. In certain embodiments, user 110A may receive a notification that he or she is being paired with other users 110. For example, user 110A may be placed in a waiting room while interaction-based recommendation tool 105 determines which user 110 to pair user 110A with. In some embodiments, interaction-based recommendation tool 105 may determine whether multiple users 110 take an action. For example, interaction-based recommendation tool 105 may determine that user 110A and user 110B have both taken an action before pairing the two. In some embodiments, interaction-based recommendation tool 105 only pairs users 110 who have taken an action first. For example, interaction-based recommendation tool 105 may determine that user 110A selected a "start interaction" button and then wait until another user (e.g., user 110B) views profiles in the queue before pairing the two users. In some embodiments, interaction-based recommendation tool 105 may pair users who have not taken an action. For example, user 110A may answer a prompt and interaction-based recommendation tool 105 may transmit a message to user 110B indicating that it wants to pair user 110B with user 110A.

In some embodiments, interaction-based recommendation tool 105 determines to pair user 110A and user 110B. Interaction-based recommendation tool 105 may pair users 110 based on profiles 130 (e.g., profiles 130a and 130b of users 110A and 100b, respectively), location data, interests, activity in system 100, interaction history 143, or any information about users 110. For example, interaction-based recommendation tool 105 may determine that users 110A and 110B were paired and had an interaction in the past, and determine to pair them again. As another example, interaction-based recommendation tool 105 may determine that users 110A and 110B both answered a prompt or question the same way, a different way, or a complementary way, and determine to pair them. In some embodiments, interaction-based recommendation tool 105 may pair users 110 randomly or without any information about users 110. For example, interaction-based recommendation tool 105 may pair users 110 based on that fact that they are currently in system 100 and available to be paired. Even when pairing users 110 randomly, interaction-based recommendation tool 105 may take into consideration basic user preferences.

In some embodiments, interaction-based recommendation tool 105 pairs users 110 for an interaction. The interaction may be any experience where users 110 may engage with each other or others. For example, the interaction may be an interface where user 110A and user 110B may exchanges messages with each other. Messages may include a text-based message, a multi-media message (e.g., GIF, video, image, etc.), an audio message, a live video, a reaction (e.g., like, dislike, heart, smile, laugh, exclamation, etc.), an indication, a game-turn (e.g., throwing a ball in beer pong or making a guess in a game), or any type of communication. As another example, the interaction may be a game that users 110 may play together or against each other or together against others. As another example, the interaction may facilitate initiating a conversation among users 110 by leading with a prompt or question that users 110 may react to. In some embodiments, the interaction may be live such that users 110 are engaged in system 100 simultaneously to facilitate a quick and rapid exchange among users 110.

In some embodiments, interaction-based recommendation tool 105 receives from user 110A a preference indication for user 110B. The preference indication may include a positive preference indication (e.g., LIKE or SUPERLIKE), a negative preference indication (e.g., NOPE), an unsure indication, a rating, a score (e.g., a numerical score), substantive feedback (e.g., I like this person's personality, I think it is cool that she and I went to the same college), a pass indication (e.g., PASS), or no indication at all. For example, interaction-based recommendation tool 105 may transmit a request to users 110 to indicate a preference indication for user 110 that he or she is interacting or finished interacting with. The request may prompt the user for the preference indication (e.g., LIKE, NOPE, or PASS). In this example, if user 110A selects PASS then no preference indication is recorded for user 110B. Continuing this example, user 110A and 110B may be paired again in the future because there has been no rating. Further, interaction-based recommendation tool 105 may take into account that users 110A and 110B have had an interaction before but no preference indication was recorded. As another example, if user 110A selects NOPE or a negative preference indication for user 110B, interaction-based recommendation tool 105 may prevent users 110A and 110B from being paired again or prevent user 110B from viewing profile 130A of user 110A. In some embodiments, user 110 might not select any preference indication (e.g., turns off application on device 115, selects "skip" or "cancel" or time runs out). If no preference indication is selected, a default selection may be recorded by interaction-based recommendation tool 105. For example, if user 110A does not select LIKE or NOPE, interaction-based recommendation tool 105 may record the selection and/or preference indication as PASS. In some embodiments, interaction-based recommendation tool 105 does not present an option for a negative preference indication. This may create a positive environment where users 110 are either matched and able to engage further (e.g., both select a positive preference indication) or where users 110 are able to be paired for future interactions (e.g., PASS or no preference indication), thus creating no rejection or negative thoughts toward other users 110.

The preference indication may be made or received before, during, or after an interaction. For example, users may be paired together because they have already expressed positive preference indications for each other. As another example, as users 110 interact, user 110A may select a positive preference indication to signal that he or she likes user 110B. In this example, if both users 110A and 110B express a positive preference indication during the interaction, interaction-based recommendation tool 105 may determine that they have matched with each other. As another example, after an interaction has ended, interaction-based recommendation tool 105 may send a prompt for the users to select a preference indication for the other. Interaction-based recommendation tool 105 may require that users 110 indicate their preference prior to engaging in another interaction. This allows users 110 to provide feedback while the interaction is fresh in their minds. If users 110 both express positive preference indications for the other, interaction-based recommendation tool 105 may provide an opportunity for users to engage with each other at a separate time. In this example, users 110 may also be able to view additional information about other users after matching, such as profiles 130. As another example, user 110A previously expressed a positive preference indication (e.g., Liked or Super Liked) user 110B, and now users 110A and 110B are having an interaction together. In this example, user 110A may be a subscriber who is able to see anyone who has previously expressed a positive preference indication. Continuing this example, user 110B may be able to see during the interaction that user 110A expressed a positive preference indication for user 110B.

In some embodiments, interaction-based recommendation tool 105 transmits a notification, based on the preference, to user 110. The notification may include information about the preferences, whether the preferences received are the same or different, the interaction, or any information that may be transmitted to user 110. The notification may be a push notification, an indication on an interface, a message, an alert, or any type of act of notifying a user. For example, if both users 110A and 110B provide a positive preference indication, interaction-based recommendation tool 105 may transmit a notification to both of them that the other user indicated a positive preference indication (e.g., a match). In this example, the notification may also provide an opportunity for the users to continue engaging with each other (e.g., "chat now" or "go to match queue"). In some embodiments, the notification may indicate a number of connections or matches. For example, user 110A may have had interactions with a number of different users (e.g., 110B, 110C, 110D, etc.) and after exiting the last interaction, interaction-based recommendation tool 105 may present a notification indicating that user 110A now has four new matches (e.g., user 110A expressed a positive preference indication about four of those users 110 and those four users 110 expressed a positive preference indication about user 110A). By providing the number of new matches after a series of interactions with various users, it creates a positive environment focused on the connections, eliminating the sense of rejection or negativity. In this example, user 110A may receive instant gratification of new matches after a few short interactions and receive that information immediately, rather than having a delay that may cause a sense of rejection, sadness, or frustration.

In some embodiments, interaction-based recommendation tool 105 implements pairing engine 160 and interaction engine 165. Pairing engine 160 is used to determine to pair users, as described in further detail below and in the discussion of FIG. 3. Interaction engine 165 is used to create and provide a type of interaction for users 110. Examples of the types of interactions that interaction engine 165 may provide are described in further detail below, in the discussion of FIG. 4.

Pairing engine 160 may be a software module stored in memory 145 and executed by processor 140. An example algorithm for pairing engine 160 is as follows: (1) receive request to interact transmitted by user 110A; (2) analyze characteristics of user 110A (e.g., profile 130A); (3) analyze interaction history 143 of user 110A; (4) analyze characteristics and interaction history of user 110B; (5) based on characteristics and interaction history 143 of users 110A and 110B, pair users 110A and 110B. While the above example presents one possible algorithm for pairing engine 160, this disclosure contemplates that pairing engine 160 may use any algorithm operable to facilitate an interaction between users 110. For example, the algorithm used by pairing engine 160 may include modifications, additions, or omissions to the example algorithm presented above. Furthermore, the algorithm used by pairing engine 160 may include more, fewer, or other steps as compared with the example algorithm presented above, and the steps may be performed in parallel or in any suitable order. The algorithm for pairing engine 160 is described in further detail below, in the discussion of FIG. 3.

In some embodiments, pairing engine 160 determines to pair users 110 based on a variety of factors, including, but not limited to, profiles 130, preferences of users 110, locations of users 110, interaction history 143, and randomly. In some embodiments, pairing engine 160 pairs users 110 who have both requested an interaction. For example, if two users 110A and 110B both request an interaction (e.g., selecting a button such as "Enter Fast Chat"; "Request Interaction"; "Enter Speed Dating"), pairing engine 160 may pair users 110A and 110B to have an interaction. Pairing engine 160 may base this pairing on certain factors, or pair them up randomly based on the timeframe that both requested an interaction. In some embodiments, pairing engine 160 may transmit a notification to user 110 asking if that user would like an interaction. Pairing engine 160 may determine user 110A may be a good fit for another user 110B who requested an interaction, and then pairing engine 160 may actively reach out to user 110A (e.g., who is in system 100 or engaging with an application in system 100 on device 115) to see if user 110A would like to pair. If user 110A agrees, pairing engine 160 may pair users 110A and 110B for an interaction.

In some embodiments, pairing engine 160 pairs users based at least in part on one or more profiles 130 of users 110. As discussed above, profiles 130 may contain any and all information about users 110, such as age, gender, location, preferences in other users, answers to previous questions, rating information, match history, interests, hobbies, favorite types of interactions, records held for particular games, or any information about user. Profiles 130 may have some, none, or all of this information viewable to other users 110. Pairing engine 160 may analyze profiles 130 of users 110 to determine user pairings. For example, if user 110A and 110B went to the same school, pairing engine 160 may pair them together. As another example, pairing engine 160 may pair a new user 110A with a highly-rated user 110B (e.g., consistently rated highly by other users 110 and/or has high number of positive preference indications) in order to provide new user 110A with quality interactions. As an additional example, pairing engine 160 may pair together users 110A and 110B who have both travelled to the same country and may have that in common. In some embodiments, pairing engine 160 may pair users 110 based on location. For example, users 110 may be paired because they are near each other, have been near each other before, both visit the same or similar locations (e.g., love coffee shops), one user 110A is in a location that interests user 110B (e.g., user 110A lives in France and user 110B is interested in France), both are in or at a college (e.g., TinderU), both are in the same country, and/or both are in different countries. In some embodiments, pairing engine 160 may even provide the commonalities among the users 110 at the beginning of an interaction to spark conversation.

In some embodiments, pairing engine 160 pairs users 110 by analyzing interaction history 143 among users 110. Pairing engine 160 may pair user 110A with users that user 110A has never interacted with before, has interacted with before, has interacted with before in a certain time period (less than one week, more than a month), and/or has interacted with before a certain number of times (e.g., less than 3, more than 5). Pairing engine 160 may pair user 110A with users that user 110A has engaged with or seen before outside of or separate from interaction-based recommendation tool 105. For example, user 110A may be paired with a current match, someone user 110A sent messages to or vice versa, someone user 110A viewed a profile of, someone user 11A has expressed a positive preference indication for, or any other type of engagement outside of a paired interaction. In certain embodiments, pairing engine 160 may weight previous interactions based on recency, length of time, number of messages or exchanges, ratings, or any other information related to the interaction. For example, pairing engine 160 may determine that user 110A had a long interaction with user 110B where they exchanged over 100 messages less than a week ago. In this example, pairing engine 160 may pair users 110A and 110B for another interaction in order to increase the likelihood that each will express a positive preference indication for the other and create a more permanent match. In some embodiments, pairing engine 160 may pair user 110A with each of his or her matches (e.g., both users express positive preference indication for the other) who are available (e.g., in system 100 and/or engaged in an application on device 115) for an interaction. By pairing user 110A with matches, pairing engine 160 enables users 110 to have additional interactions separate from a match queue or message system, allowing users 110 to connect, find commonality, and get to know each other better.

In some embodiments, pairing engine 160 pairs users based on responses from user 110 to a prompt, choice, or question. Pairing engine 160 may use the responses to pair users 110 for an interaction. For example, if users 110A and 110B answer a question the same, pairing engine 160 may pair them. As another example, pairing engine 160 may pair users 110A and 110B if they have different answers. In some embodiments, pairing engine 160 transmits a prompt, choice, or question to users 110. Users 110 then select a response, and a response by each user 110 is received by pairing engine 160. For example, pairing engine 160 may transmit a prompt to users 110 with a question: "What do you like to do more on the weekends? Exercise; Chill and Relax; Work, work, work; or Kick It with Friends." In this example, user 110A may transmit a selection of "Chill and Relax" while user 110B may transmit a selection of "Kick It with Friends" to pairing engine 160. Pairing engine may review these selections and determine that users should or should not be paired based on the selections. Pairing engine 160 may present any number of prompts, choices, questions, or selections. In some embodiments, pairing engine 160 may present a series of questions in order to pair users 110. For example, pairing engine 160 may ask all users 110 who have requested an interaction a number of questions, such as three. While users 110 are answering those questions, pairing engine 160 may analyze selections and response to optimize pairs among users 110. For example, pairing engine 160 may pair users 110 who answered all three questions identically, differently, similarly, or exactly opposite. In some embodiments, pairing engine 160 may transmit these prompts, choices, and selections to interaction engine 165 that may present these responses to users 110 in their interaction to spark conversation. In some embodiments, pairing engine 160 transmits a first choice to users 110, receives a selection from user 110A in response to the first choice, receives a selection from user 110B in response to the first choice, and in response to receiving the response or selection from user 110A and the response or selection from user 110B, pairing engine 160 determines to pair users 110A and 110B. In some embodiments, pairing engine 160 may transmit responses to interaction engine 165 to be presented to users 110. For example, if user 110A selections option A and user 110B selects option B, that can be displayed to both users 110A and 110B in the interaction. By displaying responses or selections, interaction engine 165 may provide information about the other user such that it initiates or facilitates conversation between the two users.

In some embodiments, pairing engine 160 may pair any number of users based on an experience before being paired. For example, users 110 may have both engaged in a live digital experience (e.g., Swipe Night) and selected similar decisions and answers. As another example, users 110 may each independently play a game before being paired and the score of the game determines what pairing occurs. Pairing engine 160 may pair users 110 who both request and/or have engaged in a number of interactions previously (e.g., certain amount per day, a high number recently, etc.).

In some embodiments, pairing engine 160 may join any number of users 110 together for an interaction. Pairing engine 160 may join two users (e.g., 110A with 110B), one user with a group of users (e.g., 110A with 110B, 110C, and 110D), two groups of users (e.g., 110A and 110B with 110C and 110D), one group of users (e.g., 110A, 110B, 110C), or any combination of users 110 to create an interaction. Any of these combinations may be referred to herein as a pair. Pairing engine 160 may determine the number of users based on a request by one or more users 110, preferences of users 110, time, number of users 110 waiting to be paired, or any other considerations.

This disclosure contemplates that pairing engine 160 may consider any number of factors, in addition to responses and selections received from users 110, to determine pairings among users 110A to 110N. As an example, in embodiments in which pairing engine 160 employs a machine-learning algorithm trained to generate ranked lists of users 110 to pair based on attributes that include the users' interaction history 143, the machine-learning algorithm may operate on additional attributes obtained from profiles 130A through 130N. In such embodiments, interaction history 143 and outcomes of interactions (e.g., user 110A is undefeated in an interaction game) determined by tool 105 may be placed in a user's profile 130, such that a machine-learning algorithm configured to extract and operate on attributes obtained from profiles 130 may easily incorporate the additional attributes associated user 110 placed into profiles 130. As another example, in certain embodiments, pairing engine 160 may determine pairs based on information contained in profiles 130A through 130N and then rank these pairings, or select a subset of these recommendations, based on the similarity of the choices made by users. As a further example, pairing engine 160 may retrieve birthday information from profile 130 of user 110 to determine a zodiac sign and pair users 110 based on zodiac compatibility. In certain embodiments, pairing engine 160 may consider the ages, genders, and locations of users 110 in determining pairings among users 110. For example, pairing engine 160 may pair user 110A that correspond to users 110B through 110N that fall within age, gender, and/or location ranges specified by user 110A. As another example, in certain embodiments in which pairs generated for user 110A consist of a ranked list of potentially compatible users, pairing engine 160 may prioritize user 110B who has previously had an interaction with user 110A and/or viewed profile 130A belonging to user 110A, by increasing the ranking of user 110B. This may be desirable as previous interactions (e.g., where user 110B expressed a positive preference indication for user 110A) and/or profile views may indicate that user 110B has an interest in user 110A and may therefore be likely to match with user 110A, when pair with user 110A. As a further example, in certain embodiments in which pairs generated for user 110A consist of a ranked list of compatible users, pairing engine 160 may prioritize user 110B based on the number of previous interactions user 110B has participated in (e.g., with user 110A or generally with other users). For example, pairing engine 160 may increase the ranking of user 110B if user 110B is participating in his or her first paired interaction. This may be desirable to help ensure that users 110 who frequently participate in interactions have the opportunity to match with new users 110, rather than continually receiving recommendations of the same set of users.

In some embodiments, interaction engine 165 is used to create and provide a type of interaction for users 110. Interaction engine 165 may be a software module stored in memory 145 and executed by processor 140. Interaction engine 165 may rely on a series of factors and inputs to determine the type of interaction to provide for paired users and facilitate the interaction itself. Examples of interactions include, but are not limited to, questions, ice breakers, prompts, reactions (e.g., Hot Take), select option, cooperative game, competitive game, lights out (e.g., without viewing information about user 110 during interaction), message rooms, chat rooms, group rooms, group hangouts, group games, video messages, video calls, avatar interactions, or any other type of interaction. Further examples of the types of interactions that interaction engine 165 may provide are described in further detail below, in the discussion of FIG. 4.

In some embodiments, interaction engine 165 determines a type of interaction to provide for paired users 110. Interaction engine 165 may rely on a number of factors to determine the type of interaction, including, but not limited to, interaction history 143 of users 110 (e.g., user 110A and 110B are both undefeated in Party Pong, requests by users 110 (e.g., "Play Hot Takes" or "Play Party Pong"), time of day (e.g., happy hour games or morning coffee chats), day of the week (special events, cultural moments), length of time for interaction, number of users 110 paired and/or joining (e.g., group interaction), or any information that may indicate a type of interaction to use. Interaction engine 165 may transmit a list of types of interactions to select from, such as various question prompts, games, timed interactions, message limits, or any form of interaction, and receive a selection from user 110. Interaction engine 165 may determine the type of interaction without any input or selection from user 110. For example, interaction engine 165 may provide a timed messaging interaction to encourage a live and quick interaction among users 110.

In some embodiments, interaction engine 165 presents information to users 110 to facilitate a conversation. Interaction engine 165 may provide some information about users 110 in the interaction. For example, interaction engine 165 may determine or receive information from another component of system 100 about something users 110 have in common, such as they both went to the same college, and indicate that commonality on the interface for users 110 to see during the interaction. This may spark conversation among users 110 and give them a topic to immediately discuss, thus creating a high likelihood of a connection, a positive preference indication, or a match. As another example, interaction engine 165 may indicate to users 110 (e.g., a notification or in interaction itself) that each of them are undefeated in the game that they are about to engage in while interacting. This may provide a topic for users to discuss (e.g., how many games the other has played, why they like this game) while they play the game and focus their attention on it. Interaction engine 165 may provide some prompt or question in the interaction. For example, interaction engine 165 may provide a prompt to respond to, such as "Pineapple is the best pizza topping" and solicit responses from users 110, such as "That is disgusting" or "Meh, not for me." The responses from users 110 may be selected from a list of options or freeform where user 110 types his or her own response.

In some embodiments, interaction engine 165 determines what is presented to users 110 via interface 150 during an interaction. As discussed above, the interaction itself may have certain graphics or presentations associated with it (e.g., prompts, questions appear as words and/or games show graphics). Interaction engine 165 may present additional information related to users 110 in the interaction. For example, the interaction may present information about users 110, such as profiles 130, pictures, names, avatars representing user 110, interaction history 143 (e.g., "You've had an interaction with this user" or "You and this user played a game together last week"), and/or any information related to user 110. In some embodiments, interaction engine may allow user 110A to view profile 130B of user 130B before, during, or after an interaction. In certain embodiments, interaction engine may prevent user 110A from viewing any information about user 110B (e.g., Lights Out interaction). In some embodiments, an avatar may represent user 110. User 110 may create or design the avatar himself or herself, or have interaction engine 165 create it. Interaction engine 165 may use input from device 115 to animate the avatar. For example, when user 110A is smiling, interaction engine 165 may have the avatar representing user 110A smile.

In some embodiments, interaction engine 165 determines to end an interaction. Interaction engine 165 may determine to end an interaction based on information from user 110. For example, user 110 may request that interaction end, exit system 100 and/or an application on device 115 implementing interaction engine 165, rate other user 110 in the interaction, expire a timer, send an exit message, send a last message, or any other information provided by user 110.

In some embodiments, interaction engine 165 may determine to end an interaction based on the type of interaction. Interaction engine 165 may end an interaction based on a timer, a game being complete, a certain number of messages being exchanged, one or both users exiting the interaction or system 100, or any information indicating the interaction should end. In some embodiments, interaction engine 165 may end an interaction by preventing users 110 from transmitting messages or engaging with the others. For example, if the interaction is a message room where users 110 may transmit messages back and forth, interaction engine 165 may end the interaction by removing users 110 from the message room and preventing them from seeing the other users. As another example, if the interaction is a game that has ended or reached completion, interaction engine 165 may send a notification that the interaction has ended and solicit a rating or preference indication regarding the other users 110 participating in the interaction. In some embodiments, when interaction engine 165 determines to end an interaction, interaction-based recommendation tool 105 or pairing engine 160 may pair users 110 with different users in a new interaction. For example, user 110A may be in a message room with user 110B and when the timer expires, user 110A may be moved to a separate message room with user 110C. By creating a series of interactions for user 110A (e.g., separate message rooms with user 110B, 110C, 110D, etc.), user 110A is able to meet a number of other users 110, have interactions with them, and increase the likelihood of a connection or match in system 100.

In some embodiments, interaction engine 165 may create a timed interaction, where the interaction will last for a specific time or time-related. For example, interaction engine 165 may set one or more timers for a fixed time (e.g., 1 second, 5 seconds, 20 seconds, 1 minute, 5 minutes, or any amount of time) and end the interaction after users 110 have engaged for that time period. Interaction engine 165 may display a timer to users 110 to encourage conversation and engagement before the timer expires. In some embodiments, interaction engine 165 may create a time-related interaction. Interaction engine 165 may have a timer set for a fixed time (e.g., 5 seconds, 1 minute). Interaction engine 165 may determine that a message is transmitted among users 110 in the interaction. In response to determining that a message is transmitted among users 110, interaction engine 165 may update the timer. For example, users 110A and 110B may begin an interaction with a 20-second timer. Five seconds elapse before user 110A sends a message to 110B. Once the message is sent, interaction engine 165 may update the timer to 20 seconds. By putting users 110 on a timer to send a message, it encourages faster and quicker communications. In some embodiments, interaction engine 165 may increase the remaining time based on the exchange of messages. For example, interaction engine 165 may add 5 seconds to a timer every time a message (or other communication such as picture, emoji, game move, etc.) is transmitted. In this example, user 110A and 110B may exchange 10 messages in the first few seconds of the interaction, and thus the timer is set to 50 seconds for the interaction to last. This timer encourages users 110 to transmit multiple messages back and forth with each other, thus creating engaging and fun interactions. In certain embodiments, interaction engine 165 may end the interaction after the timer expires and runs to 0. In some embodiments, interaction engine 165 may not use a timer and provide an untimed interaction.

In some embodiments, interaction engine 165 may store information related to an interaction to interaction history 143. During or after an interaction, interaction engine 165 may store data regarding that interaction among users 110. Interaction engine 165 may save the data for each separate user 110 in the interaction. For example, after a 2-minute timed interaction between user 110A and user 110B, interaction engine 165 may save that information to interaction history 143 for user 110A and separately to interaction history 143 for user 110B. Interaction history 143 may store any information about the interaction, including date, time, duration of the interaction, substance of the interaction, type of interaction (e.g., conversation, games, video, group discussion, event), submission of preferences after an interaction, or any other piece of data about or relating to the interaction. In some embodiments, interaction engine 165 transmits interaction history 143 to pairing engine 160 for it to analyze interaction history 143 and determine whether users 110 should be paired together for an interaction.

In some embodiments, interaction engine 165 may add information related to an interaction or interaction history 143 to profile 130. Interaction engine 165 may add information such as ratings from interactions, number of interactions, results from interactions, answers from prompts or questions in interactions, results from game-type interactions, or any information related to an interaction. For example, if user 110A selects a particular game to play for interactions (e.g., emoji puzzle), interaction engine 165 may save to profile 130A of user 110A that he or she is interested in that game. As another example, if user 110A has never been beaten by another user 110 in party pong, interaction engine 165 may add to profile 130A of user 110A that he or she is undefeated in party pong. As a further example, if user 110A answers a question of "What is your favorite weekend activity" as "exercising" in an interaction, interaction engine 165 may add "exercising" as an interest in profile 130A of user 110A. In some embodiments, information added by interaction engine 165 to profile 130 may be viewable to other users 110. Information added by interaction engine 165 to profile 130 may not be viewable or accessible to other users 110 in certain embodiments.

Modifications, additions, or omissions may be made to the systems described herein without departing from the scope of the invention. For example, system 100 may include any number of users 110, devices 115, networks 120, and databases 125. The components may be integrated or separated. Moreover, the operations described above may be performed by more, fewer, or other components. For example, although described as interaction-based recommendation tool 105, pairing engine 160, and interaction engine 165 performing certain operations, any component in system 100 may perform these operations. Additionally, the operations may be performed using any suitable logic comprising software, hardware, or other logic. As used in this document, "each" refers to each member of a set or each member of a subset of a set.

Figure 2:
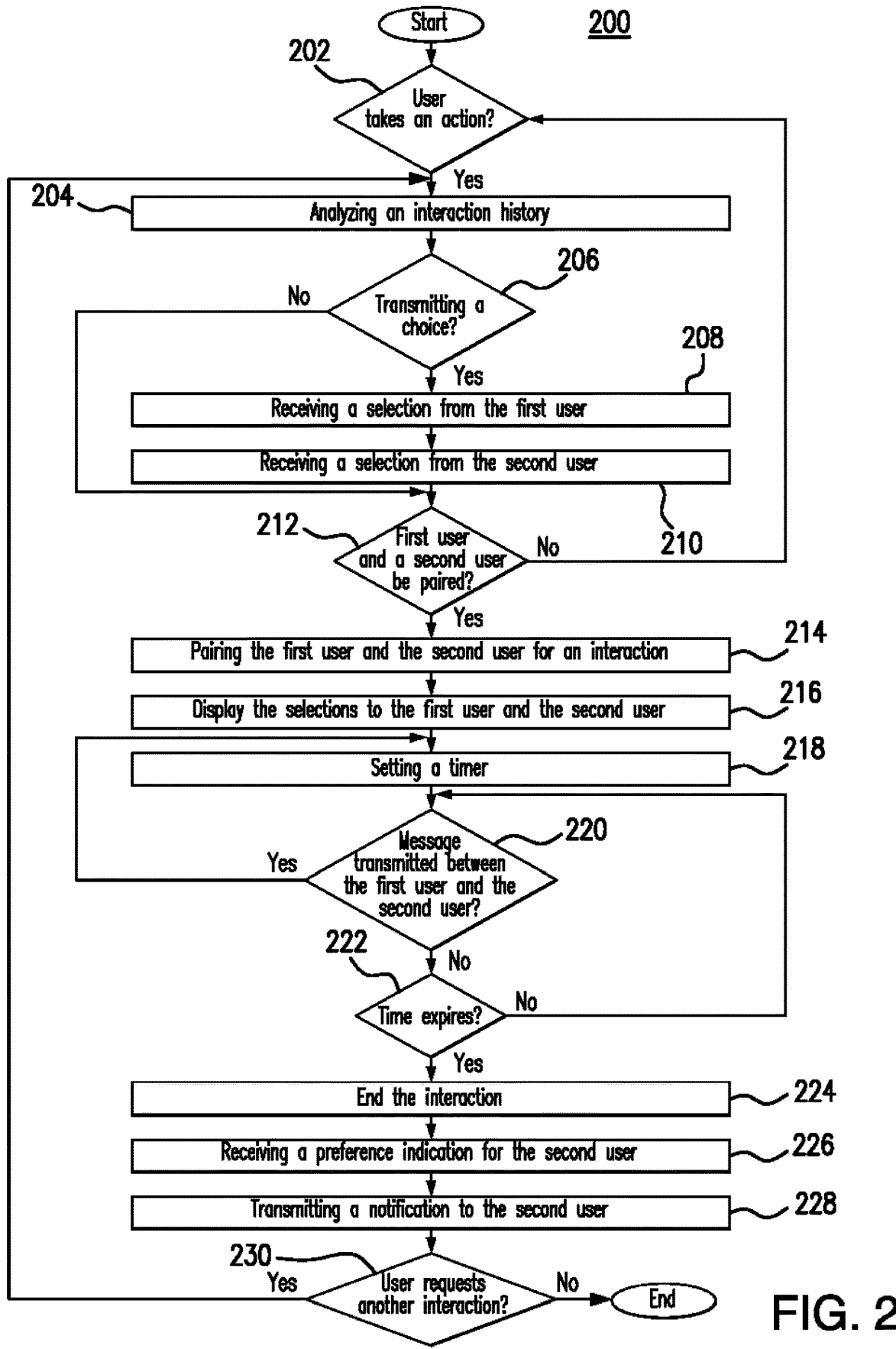
FIG. 2 presents a flowchart illustrating the process for interaction-based recommendation tool of the system of FIG. 1.

FIG. 2 presents a flowchart illustrating method 200 for interaction-based recommendation tool 105 of system 100 of FIG. 1. This method 200 illustrates how interaction-based recommendation tool 105 provides opportunities for live digital interactions among users 110 and provide recommendations based on those interactions.

At step 202, in some embodiments, interaction-based recommendation tool 105 determines whether user 110 takes an action. Interaction-based recommendation tool 105 may receive information related to actions of users 110 at interface 150 via network 120 from user device 115. For example, interaction-based recommendation tool 105 may receive information that user 110 has opened an application in system 100 on user device 115. As another example, interaction-based recommendation tool 105 may determine user 110 took an action within the application such as viewing profiles 130 of users 110, playing a game, messaging user 110 or any other interaction within system 100. In some embodiments, interaction-based recommendation tool 105 may determine whether another user, or any number of users, takes an action at step 202. Interaction-based recommendation tool 105 may wait to pair users 110 until both have taken an action to indicate preference, readiness, and/or availability to be paired. If interaction-based recommendation tool 105 determines at step 202 that a user has not taken an action, it remains at step 202 until it determines user 110 has taken an action. If, at step 202, interaction-based recommendation tool 105 determines user 110 takes an action, the method continues to step 204.

At step 204, in some embodiments, interaction-based recommendation tool 105 analyzes interaction history 143 between user 110A and 110B. Interaction-based recommendation tool 105 may retrieve interaction history 143 from memory 145. Interaction history 143 may include information about past interactions between user 110A and 110B, such as time, date, length, frequency, number, and result of past interactions. For example, interaction history 143 may indicate that users 110A and 110B interacted twice before for over 15 minutes each time resulting in user 110A providing a positive preference indication for user 110B. Interaction-based recommendation tool 105 may rely on this information in determining whether and when to pair users 110A and 110B together again. As another example, interaction history 143 may indicate that users 110A and 110B have never had an interaction together before. Interaction history 143 may include information about interactions among all users 110 in system 100.

At step 206, in some embodiments, interaction-based recommendation tool 105 determines whether a choice, prompt, or question is transmitted to users 110. Interaction-based recommendation tool 105 may transmit a choice, prompt, or question to users 110 based on the type of interaction. For example, in order to stimulate conversation among users once paired together, interaction-based recommendation tool 105 may transmit a choice, prompt, or question among two or more options to users 110 and share those selections or responses of users 110. In this example, interaction-based recommendation tool 105 may ask users 110 whether they prefer sleeping in on the weekends or getting up early, or ask the favorite pizza topping of users 110. This choice may be any information, request, or question to users 110 to provide more information about their preferences, likes, dislikes, interests or anything about user 110. If, at step 206, interaction-based recommendation tool 105 determines that a choice, prompt, or question is transmitted, the method continues to step 212 as discussed below. If, at step 206, interaction-based recommendation tool 105 transmits a choice, prompt, or question to users 110, the method continues to step 208.

At steps 208 and 210, in some embodiments, interaction-based recommendation tool 105 receives a selection or response (or selections or responses) from each user. At step 208, interaction-based recommendation tool 105 receives a selection or response from user 110A and at step 210, it receives a selection or response from user 110B. Continuing the example from above, interaction-based recommendation tool 105 may ask users 110A and 110B their preference on sleeping in or getting up early on the weekends. At step 208, user 110A may indicate that he or she prefers to wake up early and at step 210, user 110B may indicate that he or she likes to sleep in on the weekends. The selections or responses at 208 and 210 may be selected from a list of options or a freeform response where users can type in their selection to the choice or question from step 206.

At step 212, in some embodiments, interaction-based recommendation tool 105 determines whether user 110A and user 110B should be paired. Interaction-based recommendation tool 105 may rely on a number of factors to determine whether users should be paired such as information in profiles 130 of users 110, information related to interaction history 143, or any information relating to whether the users 110 should be paired. In some embodiments, interaction-based recommendation tool 105 may use the selections received at steps 208 and 210 to determine whether users should be paired. Continuing the example from above, if user 110A and user 110B both prefer waking up early on the weekends, interaction-based recommendation tool 105 may determine that users should be paired for an interaction. As another example, if users 110A and 110B do not respond with the same selection in steps 208 and 210, interaction-based recommendation tool 105 may determine that users 110A and 110B should not be paired. For example, if user 110A likes to wake up early and user 110B likes to sleep in, interaction-based recommendation tool may look for different users 110 to pair these users 110A and 110B. If at step 212, interaction-based recommendation tool 105 determines that the first user and the second user should not be paired, method 200 returns to step 202 and determines whether users take any actions to be paired. If, at step 212, interaction-based recommendation tool 105 determines that user should be paired, method 200 continues to step 214.

At step 214, in some embodiments, interaction-based recommendation tool 105 pairs users 110 for an interaction. Interaction-based recommendation tool 105 may also send this information about the pairings to any other component in system 100 such as user devices 115, network 120, interface 150, interaction history 143, pairing engine 160, or interaction engine 165. In some embodiments, interaction-based recommendation tool 105 may pair users by putting the two of them in an interaction, such as a message room, a video room, or a game, where users may interact with each other. In some embodiments, interaction-based recommendation tool 105 may determine the type of interaction that users should engage in. This may be based on interaction history 143, preferences of users 110, profiles 130 of users 110, or any other information that may provide guidance to interaction-based recommendation tool 105 on the type of interaction to being.

At step 216, in some embodiments, interaction-based recommendation tool 105 displays the selections from step 208 and 210 to users 110. Interaction-based recommendation tool 105 may transmit the selections from interface 150 via network 120 to user device 115 for display. For example, if both users 110A and 110B indicated from steps 208 and 210 that they both like to wake up early on the weekends, at step 216 interaction-based recommendation tool 105 may display that users 110A and 110B have this in come and both prefer to wake up early on the weekends. This may facilitate conversation between users 110A and 110B knowing that they have this preference or similarity between them. As another example, at step 216, interaction-based recommendation tool 105 may display selections from step 208 and 210 even if users 110A and 110B selected different options. Continuing the example from above, if user 110A selected waking up early on the weekends and 110B selected sleeping in on the weekends, interaction-based recommendation tool 105 at step 216 may display this information to users 110A and 110B to indicate that they do not have this in common. This may also facilitate conversation given that the users 110A and 110B have opposite preferences.

At step 218, in some embodiments, interaction-based recommendation tool 105 sets a timer for a fixed time. Interaction-based recommendation tool 105 may determine a fixed time for the timer that may be preset by users 110 or determined by interaction-based recommendation tool 105. For example, interaction-based recommendation tool 105 may set a timer for 20 seconds, 40 seconds, a minute, or any amount of fixed time. In some embodiments, the timer may be set for a variable or random amount of time that may depend on users 110, interaction history 143, or other factors.

At step 220, in some embodiments, interaction-based recommendation tool 105 determines whether a message has been transmitted between users 110A and 110B. Interaction-based recommendation tool 105 may receive this information at interface 150 via network 120 from user device 115. If at step 220 interaction-based recommendation tool 105 determines that a message has been transmitted among users 110, method 200 returns to step 218 and sets the timer for a fixed time. As an example, at step 218, interaction-based recommendation tool 105 may set a timer for 20 seconds. If at step 220, interaction-based recommendation tool 105 determines that user 110A sends a message to user 110B, it may update the timer to 20 seconds no matter how much time has elapsed, providing users 110 another full 20 seconds to send another message. As another example, if at step 220 interaction-based recommendation tool 105 determines that five messages have been transmitted between users 110A and 110B, method 200 may return to step 218 and update the timer to 20 seconds. As another example, after determining a message or more has been transmitted among users 110, it may increase the remaining amount of the timer. In this example, if five messages are transmitted, interaction-based recommendation tool 105 may increase the amount of time on timer at step 218, such as five times the amount of the fixed time, or 1 minute and 40 seconds in this example. If at step 220, interaction-based recommendation tool 105 determines that a message has not been transmitted among users, method 200 continues to step 222.

At step 222, in some embodiments, interaction-based recommendation tool 105 determines whether time on the timer from step 218 has expired. If time has expired at step 222, method 200 continues to step 224 where interaction-based recommendation tool 105 ends the interaction. If at step 222 the timer has not expired, interaction-based recommendation tool 105 continues to determine whether messages are being transmitted among users at step 220 until the timer expires at step 222. By having a fixed timer and requiring users to send message to prevent the timer from expiring, it facilitates conversation and transmission of messages among users 110. Rather than send a message one day and wait hours or days for a response, users 110 are encouraged to transmit quick messages in a live interaction format to ensure the continued engagement among users 110. In some embodiments, interaction-based recommendation tool 105 may display the amount of time left on display to users 110. This again may encourage users to send messages to prevent the timer from expiring at step 222.

At step 224, and some embodiments, interaction-based recommendation tool 105 ends the interaction. The interaction may be ended by removing users 110A and 110B from the chat room, messaging room, or interface where they are able to interact. Interaction-based recommendation tool 105 may prevent users from interacting in this live format once the interaction has ended at step 224. In some embodiments, interaction-based recommendation tool 105 may remove the interaction from user device 115 and replace it with a preference indication, rating, or indication that the interaction has ended, thus informing users 110 that interaction is complete.

At step 226, and some embodiments, interaction-based recommendation tool 105 receives a preference indication for user 110. Interaction-based recommendation tool 105 may receive a preference indication for user 110 at interface 150 via network 120 from user device 115. For example, after the interaction ends at step 224, interaction-based recommendation tool 105 may present an option to user 110A to provide a preference indication for user 110B with whom they have interacted. As an example, user 110A may indicate that he or she likes, dislikes, or passes on user 110B. If no preference indication is received from user 110A, interaction-based recommendation tool 105 may provide a default selection of "pass" or "no indication" to where no preference indication is recorded for user 110B. In some embodiments, interaction-based recommendation tool 105 may receive preference indications from both users 110A and 110B that had this interaction. If both users submit a positive preference indication, that may create a match where users 110A and 110B are able to view profiles 130A and 130B of each other and potentially interact in a different format.

At step 228, in some embodiments, interaction-based recommendation tool 105 transmits a notification to user 110B. This notification may include information about the preference indication received at step 226. For example, if user 110A transmits a positive preference for 110B and if user 110B transmits a positive preference for user 110A, user 110B may receive a notification that they have matched and/or that they have both expressed positive preference indications for the other. This notification may prompt user 110B to further engage and interact with user 110A, for example, by viewing profile 130A and/or sending a separate message to user 110A outside of interaction. In some embodiments, interaction-based recommendation tool 105 may transmit this notification to both users 110A and 110B.

At step 230, in some embodiments, interaction-based recommendation tool 105 determines whether it receives an indication that user 110A wants another interaction. For example, interaction-based recommendation tool 105 may ask user 110A whether user 110A wants to be paired again. If user 110A indicates yes, then method 200 returns to step 204 to analyze an interaction history and determine which user(s) 110 to pair with user 110A. If interaction-based recommendation tool 105 does not receive an indication that user 110A wants another interaction, method 200 ends.

Modifications, additions, or omissions may be made to the methods described herein without departing from the scope of the invention. For example, the steps may be combined, modified, or deleted where appropriate, and additional steps may be added. In an embodiment where interaction-based recommendation tool 105 creates an untimed interaction, steps 218 and 222 may be omitted. As another example, step 204 of analyzing interaction history 143 may be omitted if users 110 are paired randomly rather than based on any interaction history 143. Additionally, the steps may be performed in any suitable order without departing from the scope of the present disclosure. While discussed as interaction-based recommendation tool 105 performing the steps, any suitable component of system 100 may perform one or more steps of method 200. As one example, pairing engine 160 may perform steps 204-216 and interaction engine 165 may perform steps 216-224. As another example, interaction-based recommendation tool 105 may perform steps 202-210 and steps 226-228, pairing engine 160 may perform steps 212-214, and interaction engine 165 may perform steps 216-224.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

Figure 3:
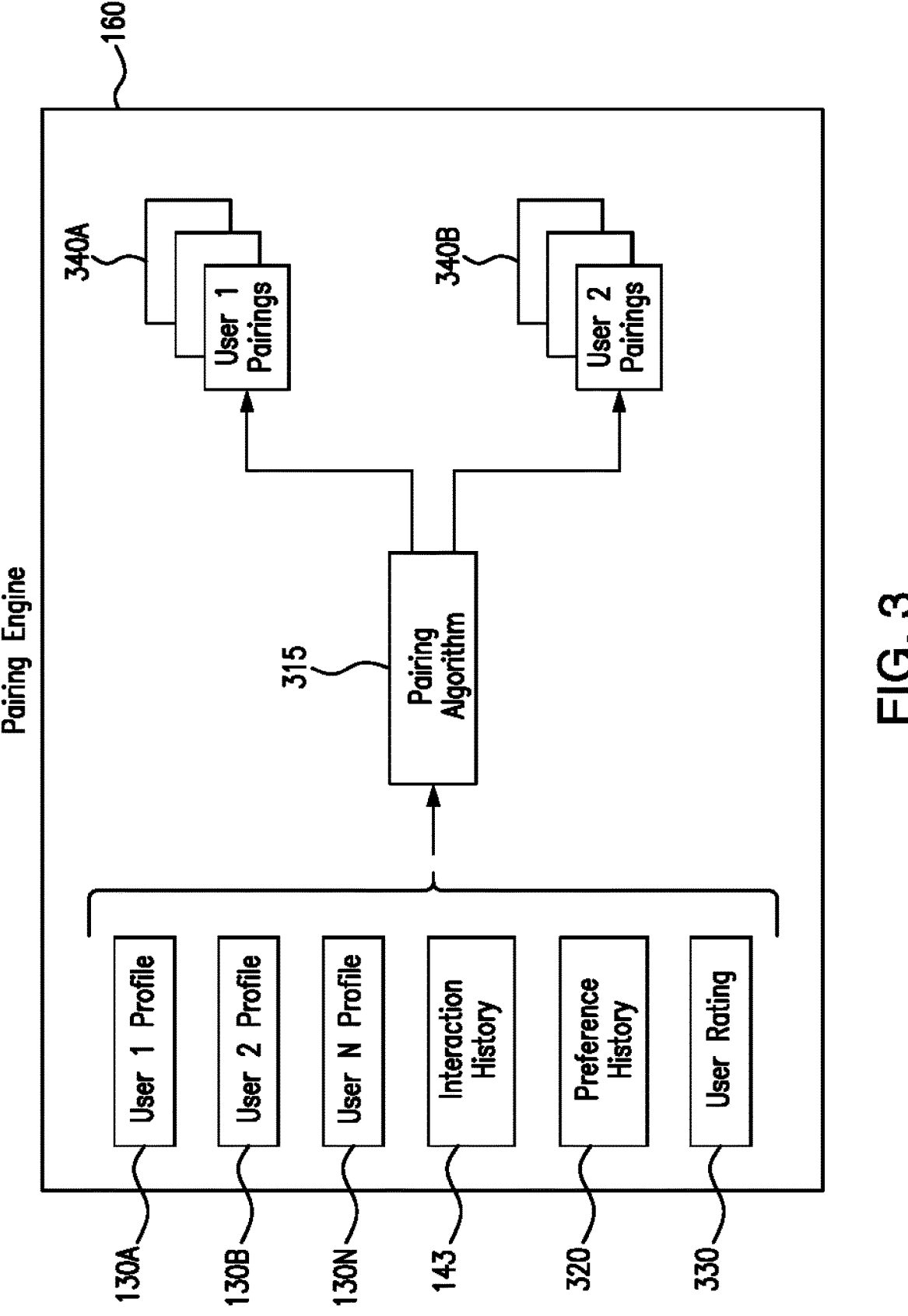
FIG. 3 illustrates the pairing engine of the interaction-based recommendation tool of the system of FIG. 1.

FIG. 3 illustrates pairing engine 160 of interaction-based recommendation tool 105 of system 100 of FIG. 1. This disclosure contemplates that in certain embodiments, pairing engine 160 may receive information from profiles 130 of users 110, interaction history 143, preference history 320, and user ratings 330 to provide to pairing algorithm 315 used by pairing engine 160 to generate pairs 340 of users who should have an interaction. Pairs 340 may be a list or indication of users 110 (e.g., users 110B and 110C) that may be a good pair for user 110A. In some embodiments, pairings 340 may be a queue of available users 110 (i.e., users 110 who are within and/or interacting with system 110) that may be paired with 110A. For example, user 110A may request a series of interactions (e.g., 5 interactions) and pairings 340 indicate the five users 110 that will be paired with user 110A. In this manner, certain embodiments may increase the likelihood that pairings generated by pairing engine 160 lead to successful interactions, due in part to feedback provided by preference indications from users 110 based on the interactions.

In certain embodiments, and as illustrated in FIG. 3, pairing engine 160 may employ machine-learning algorithm 315 to determine recommendations pairings 340. For example, pairing engine 160 may train the machine-learning algorithm to extract a set of features, based on profiles 130, interaction history 143, preference history 320, user ratings 330 (determined based on preference indications (e.g., as stored in preference history 320), and providing an assessment of user 110B by user 110A and user 110A by user 110B, respectively), or any other appropriate information, and use these features to determine a probability that a pairs 340 of users 110 may be compatible with one another. In such embodiments, pairing engine 160 may incorporate scores ratings 330 into this algorithm by creating an additional machine-learning feature associated with these scores and assigning an appropriate weight to this feature. In this manner, pairing engine 160 may determine improved pairings 340, based in part on preference indications from users 110 regarding the interactions that users 110 have participated in.

This disclosure contemplates that pairing engine 160 may incorporate information gained from responses profiles 130, interaction history 143, preference history 320, and user ratings 330 into its pairing algorithm 315 in any appropriate manner. For example, in certain embodiments, pairing engine 160 may include a collaborative filtering algorithm used to determine pairings 340 for users 110. In such embodiments, pairing engine 160 may determine pairings 340 of users 110, in part by comparing interaction history 143 and preference history 320 of users 110. For example, if pairing engine 160 determines, based on preference history 320, that users 110A and 110B have both chosen to match with a similar group of users in the past (for example, users 110A and 110B have both chosen to match with users 110C through 110E), then if user 110B chooses to match with user 110F, pairing engine 160 may determine that user 110A is also likely to match with user 110F, based on the similarity between preference histories 320. Accordingly, pairing engine 160 may pair users 110F and 110A the next time both are within and/or interacting with system 110.

In some embodiments, pairing engine 160 may employ a collaborative filtering algorithm based on information provided by users 110 through interaction history 143, rather than on preference histories 320. For example, pairing engine 160 may store information about past interactions in database 145 and use this information to generate pairings 340. For example, if user 110A and user 110B interacted with each other at least once before, pairing engine 160 may determine to pair them again to provide another interaction to increase the likelihood of positive preference indications and a match. As another example, if user 110A and user 110B have interacted with each other once a week for the past few months, pairing engine 160 may pair them together again, but using an interaction that provides more opportunity to get to know each other better.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

Figure 4A:
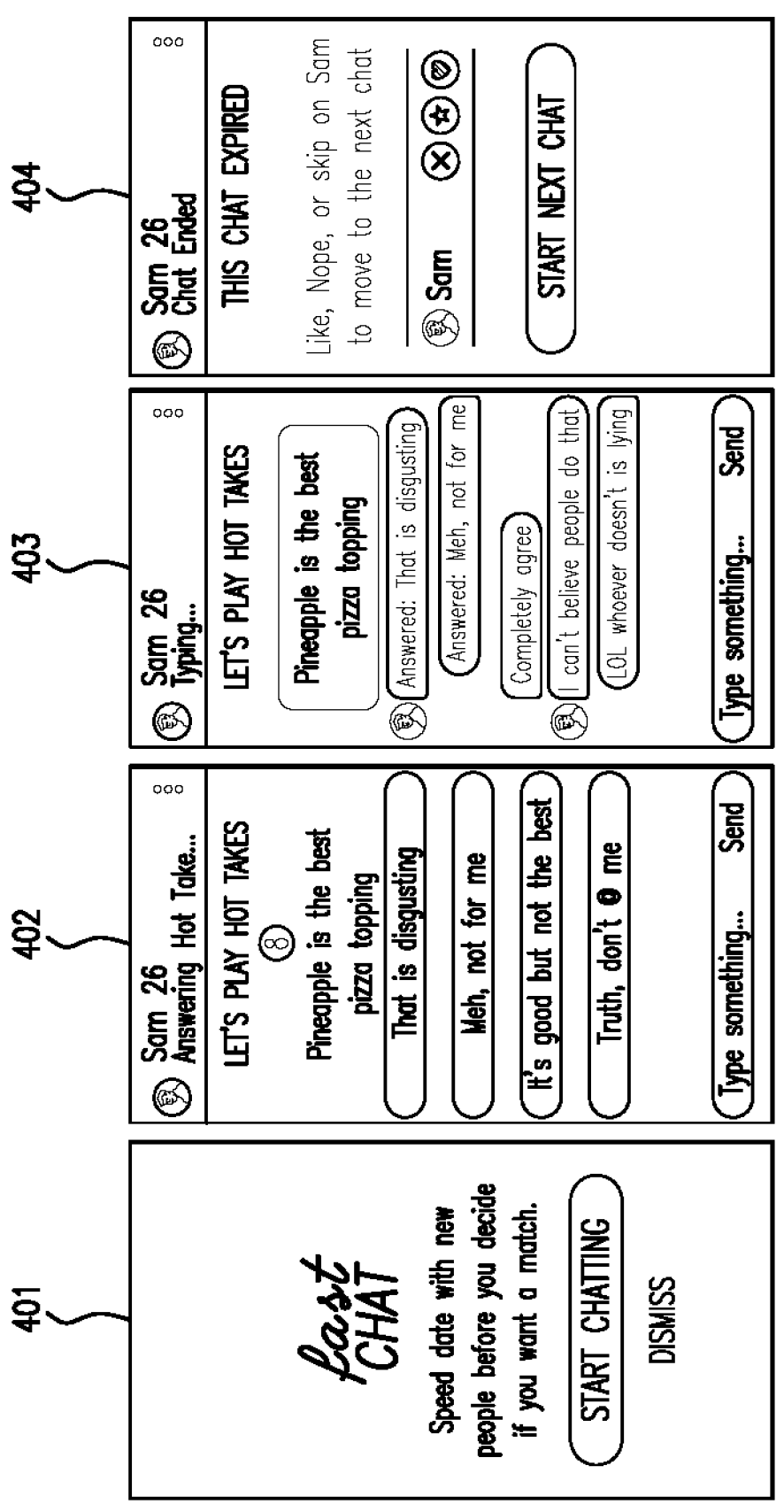
FIGS. 4A-4G present examples of a graphical user interface generated by the interaction engine of the interaction-based recommendation tool of the system of FIG. 1.
Figure 4B:
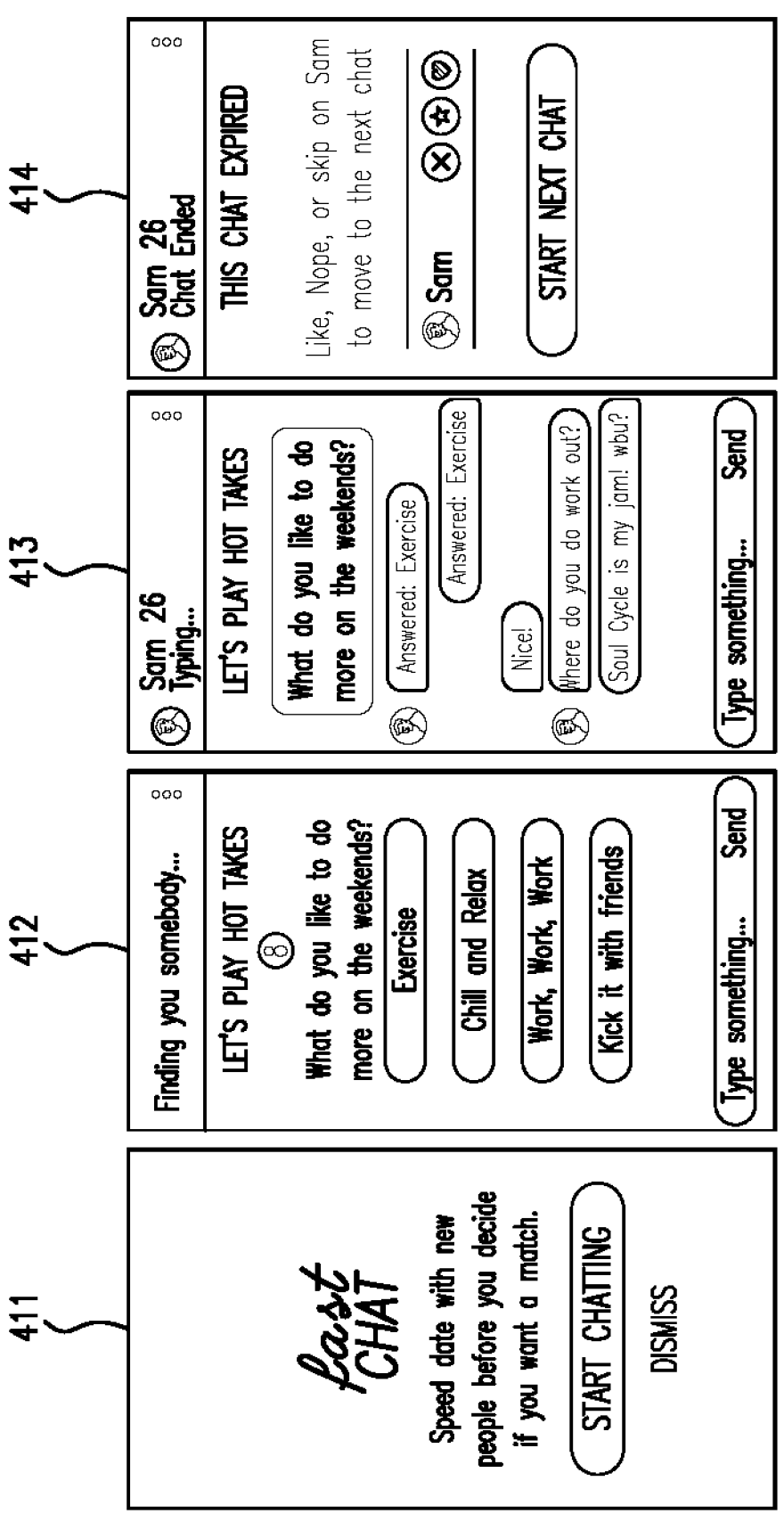
Figure 4C:
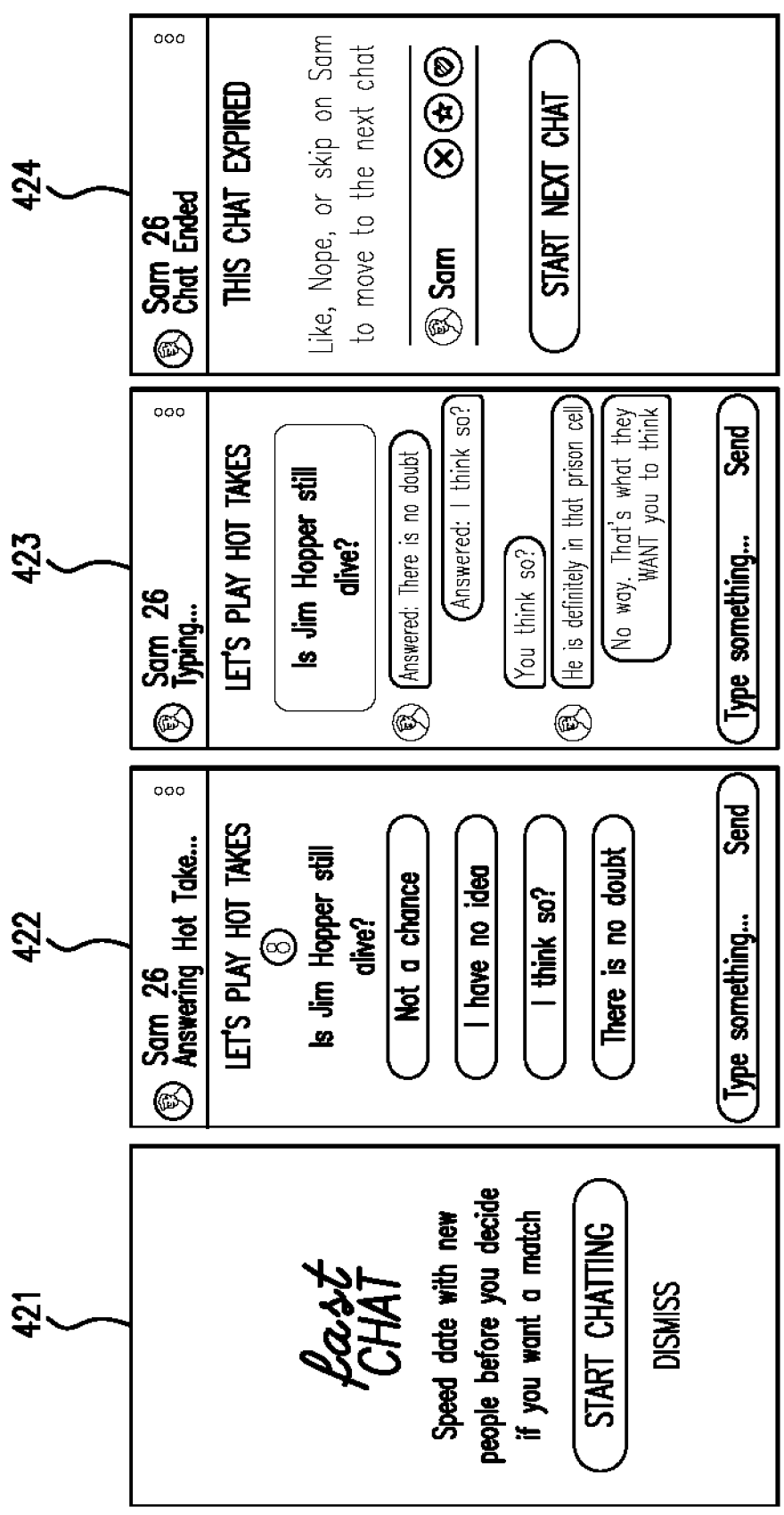
Figure 4D:
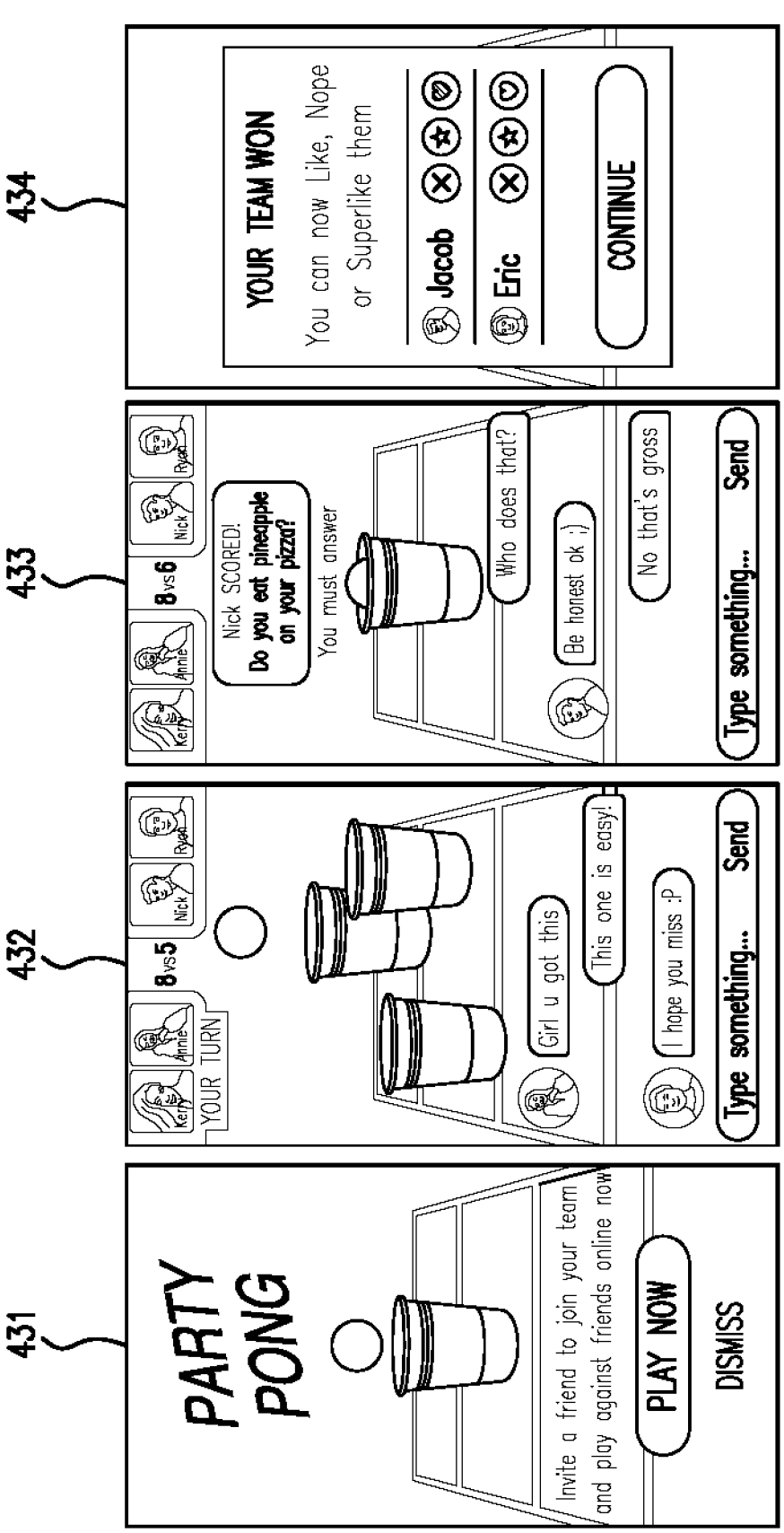
Figure 4E:
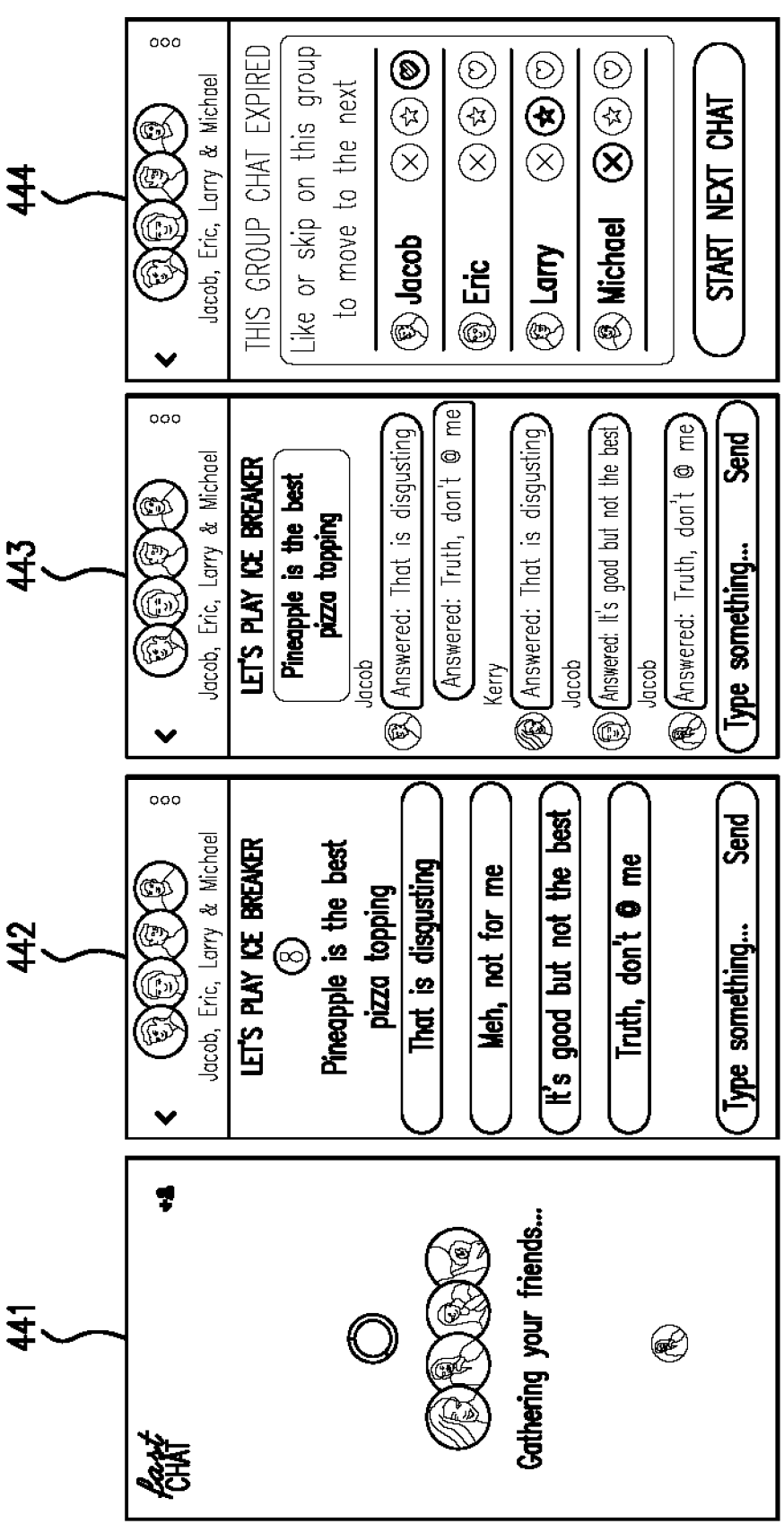
Figure 4F:
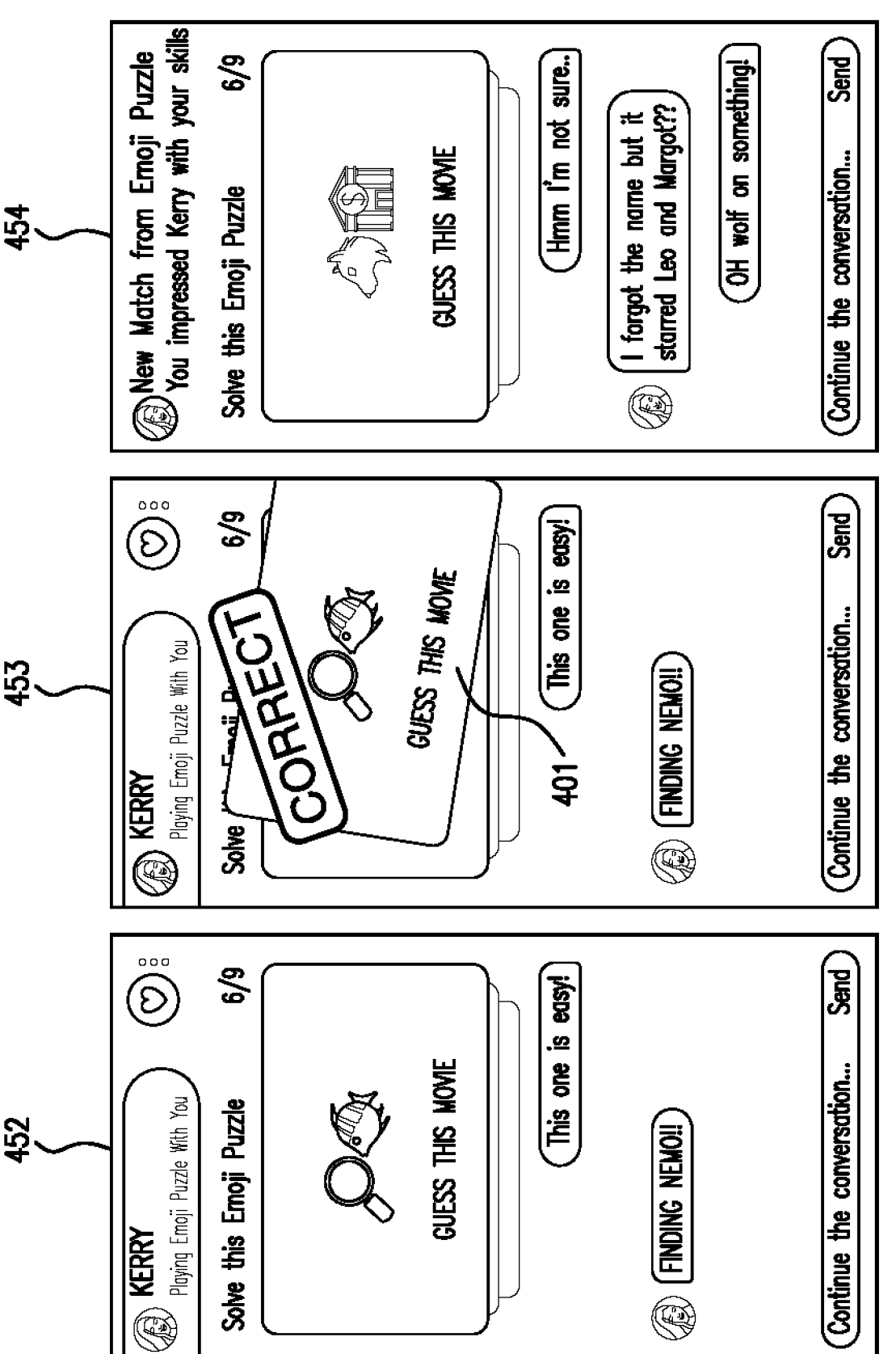
Figure 4G:
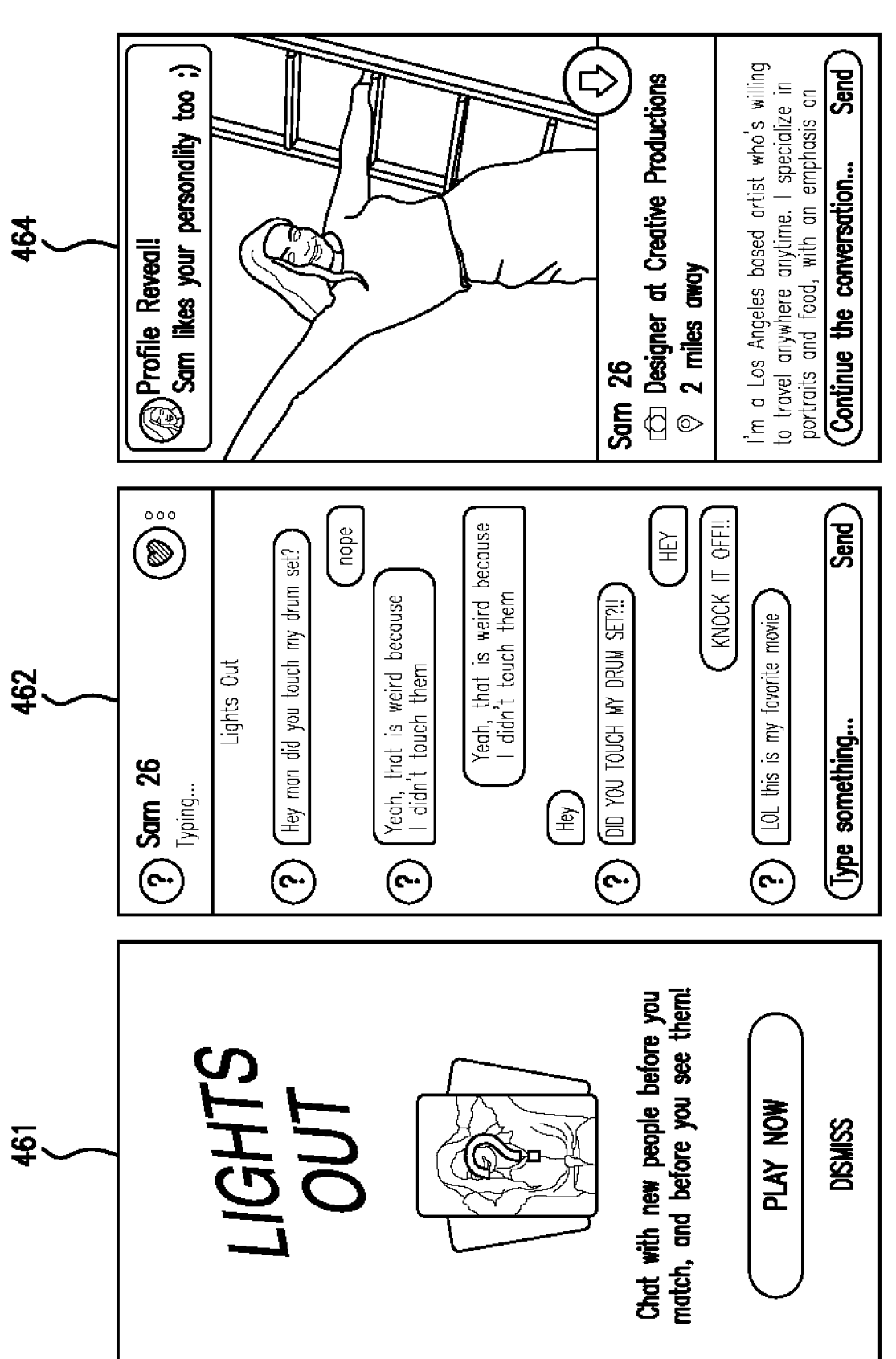

FIGS. 4A-4G present example of a graphical user interface generated by interaction engine 165 of interaction-based recommendation tool 105 of system 100 of FIG. 1. FIG. 4A, FIG. 4B, FIG. 4C, and FIG. 4E illustrate an example of a "Fast Chat," where users 110 "PLAY HOT TAKES" and answer questions to facilitate conversation. In FIGS. 4A-4C, two users are paired for a private chat. In FIG. 4E an example of a fast chat with an "ICE BREAKER" is shown with multiple users 110. In this example, interaction-based recommendation tool pairs multiple users together to have a group experience. This may provide more encouragement for interacting with other unknown (e.g., non-friend users) and allow users 110 (e.g., friends) to have joint experiences together. FIG. 4D illustrates an example of users playing "PARTY PONG." This example prompts user 110 to "invite a friend" making it a group interaction playing a game against another group. In this example, users may send messages during game play to encourage each other, share information, get to know each other, or any other reason for sending messages. FIG. 4F illustrates an example of users play "Emoji Puzzle," where emojis are shown to provide clues for a movie. User 110 is playing this game with one other user (Kerry) and sending messages back and forth. Messages may include guesses to solve the emoji puzzle and/or messages to the paired user to strategize and get to know each other better. FIG. 4G illustrates an example of users playing "LIGHTS OUT" where users 110 "chat with new people before you match, and before you see them!" This example allows users to interact with each other, such as sending messages, but without seeing personal information such as a picture, avatar, or profile. If both users indicate a positive preference for the other (i.e., by selecting the "heart" button in the top right hand corner of screen 462), then profiles and/or other personal information are revealed to each other in screen 464. LIGHTS OUT allows users 110 to lead with their personalities, rather than profiles, and have users 110 get to know each other first before learning facts about the other.

Each of FIGS. 4A-4G illustrate different aspects of an interaction. Entry point example screens 401, 411, 421, 431, 441, and 461 illustrate examples of what users 110 may view before beginning an interaction. These may provide user 110 with an opportunity to request an interaction, for example, by selecting "PLAY NOW" or "START CHATTING." By selecting these buttons, user 110 may indicate to interaction-based recommendation tool that he or she wants to begin and interaction, and in certain embodiments, a specific type of interaction. This selection may be an action at step 202 that begins method 200 in FIG. 2.

Context screens 402, 412, 422 and 442 illustrate examples of providing options for users 110 to select or provide feedback. In some embodiments, these context screens solicit information from users 110 to allow interaction-based recommendation tool 105 to analyze and use to find a good pair for the interaction. For example, context screen 412 indicates "Finding you somebody" to user 110 while user 110 answers the "HOT TAKE" question about weekend activities. Interaction-based recommendation tool 105 may use the answer from this question to find a good pair for user 110. For example, if user 110A and user 110B answered the question the same or similarly, interaction-based recommendation tool 105 may pair them. In some embodiments, these context screens solicit information from users 110 to prompt and/or facilitate conversation. For example, context screen 402 shows user 110 has been paired with "Sam" and shows both user 110 and Sam a question about pizza toppings to answer. In this example, the answers to the question in context screen 402 are shown in interaction screen 403 ("Answered") and then users react to the other's answer to facilitate conversation.

Interaction screens 403, 413, 423, 433, 443, and 452-454 illustrate examples of the interactions of users 110, and how users 110 engage with other users 110 they are paired with. This may include sending messages, videos, emojis, pictures, profiles 130, guesses, games, or any information to other users 110. In some embodiments, interactions may be timed (e.g., 1 minute long) or expire (e.g., after a game is complete), and then the interaction ends.

Rating screens 404, 414, 424, 434, and 444 illustrate examples of users 110 providing preference indications other users 110 they were paired with. For example, in rating screens 404, 414, and 424 where user 110 was paired for an interaction with SAM, interaction-based recommendation tool 105 indicates the interaction has ended and offers an opportunity to "Like, Nope, or skip on Sam" providing an X for Nope, Heart for Like, Star for Superlike, or "start next chat" to skip. Interaction-based recommendation tool 105 may use these preference indications to determine whether users are matched and may engage further. For example, at screen 404, if user 110 selected the "heart" on Sam, and Sam also selected the "heart" on his screen for user 110, they would have a match and interaction-based recommendation tool 105 may send notifications to user 110 and Sam indicating that match. In some embodiments, rating screens may include an opportunity to rate multiple users from the interaction. For example, rating screen 444 includes rating options for each of the users 110 in the interaction (Jacob, Eric, Larry, and Michael). User 110 may provide separate ratings for each (e.g., user 110 selects a heart for Jacob, no rating or a pass for Eric, a star for Larry, and an X or Nope for Michael). When an interaction includes more than two users, rating screens may provide an opportunity for user 110 to rate all other users included. In some embodiments, users 110 are not notified of the ratings of user 110 after an interaction. For example, interaction-based recommendation tool 105 will not notify Michael that user 110 provided a "Nope" on him. Michael is unaware of the rating, and may continue to a next chat where he is successful in receiving a positive preference indication. After a series of interactions, interaction-based recommendation tool may provide Michael with one notification indicating the number of positive preference indications or matches he received in the series of interactions. In this way, Michael has a positive experience, eliminating the feeling of rejection because he is only being notified of the positive ratings, and drawing attention and focus away from users who may have passed or rejected Michael. In some embodiments, rating screens also provide an opportunity to be paired for another interaction be selected "START NEXT CHAT" or "CONTINUE." If either of these are selected, interaction-based recommendation tool 105 may determine another user 110 to pair with user 110 in a new interaction.

This disclosure contemplates that example interactions displayed FIGS. 4A-4G, may contain any number of additional features. For example, in certain embodiments, interactions may include any number or type of users 110, messages, times, ratings, games, or any opportunity for interaction with other users. These example interactions are not limiting in any way.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. A system comprising an interaction-based recommendation tool comprising:

a processor configured to:

determine that a first user takes a first action with respect to an interaction-based recommendation tool;

extract a first set of features from a preference history of the first user, the first set of features indicating preferences of the first user with respect to other users;

extract a second set of features from a preference history of a second user, the second set of features indicating preferences of the second user with respect to other users;

determine to pair the first user and the second user based at least on the first action, the first set of features, and the second set of features;

pair the first user and the second user for an interaction, the interaction lasting for a first time period, the interaction is concurrent for the first user and the second user; and determine an interaction history related to the interaction;

an interface coupled to the processor, the interface configured to receive an indication of a preference of the first user for the second user at a second time, the second time being after the first time period, the indication is one of user ratings;

the processor is further configured to:

extract a machine learning feature from the indication, the machine learning feature indicating a compatibility score between the first user and the second user learned from the interaction between the first user and the second user;

update a machine learning pairing algorithm based at least on the indication weighted by the machine learning feature, the machine learning pairing algorithm being configured to generate pairs of users based at least on user profiles and user ratings in response to interactions with other users of the interaction-based recommendation tool; and determine, by executing the updated machine learning pairing algorithm, to pair the first user with a third user based at least on a second compatibility score between the first user and the third user, that is determined from a first profile of the first user, a second profile of the third user, and the interaction history.

2. The system of claim 1, wherein the processor is further configured to, in a first iteration, train the machine learning pairing algorithm to provide a first probability for compatibility between the first user and the second user based at least on a first user profile of the first user and a second user profile of the second user, wherein updating the machine learning pairing algorithm is performed after the first iteration.

3. The system of claim 1, wherein the processor is further configured to dynamically determine when to end the interaction based at least on tracking messages exchanged between the first user and the second user during the interaction, such that as a new message is exchanged between the first user and the second user during the interaction, a duration of the interaction is increased.

4. The system of claim 1, wherein the processor is further configured to prevent communication between the first user and the second user at the end of the interaction.

5. The system of claim 1, wherein the processor is further configured to assign a weight to the received indication based at least on the interaction, wherein updating the machine learning pairing algorithm is further based at least on the assigned weight.

6. The system of claim 5, wherein the processor is further configured to, in a second iteration, train the machine learning pairing algorithm to provide a second probability for compatibility between the first user and the second user based at least on the interaction history, the assigned weight to the received indication, and the user profiles.

7. The system of claim 1, wherein executing the updated machine learning pairing algorithm is in response to the interactions of users of the interaction-based recommendation tool.

8. The system of claim 1, wherein the first action comprises the first user requesting to begin the interaction with a user.

9. The system of claim 1, wherein the first action comprises the first user indicating availability to begin the interaction with a user.

10. The system of claim 1, wherein the first action comprises the first user registering.

11. The system of claim 1, wherein the interaction comprises at least one message transmitted from the first user to the second user.

12. The system of claim 1, the processor further configured to:

set a timer for a fixed time;

determine that a message is transmitted between the first user and the second user; and in response to determining that the message is transmitted between the first user and the second user, update the timer.

13. The system of claim 1, the processor further configured to:

determine to pair a third user with the first user and the second user; and pair the first user, the second user, and the third user for the interaction.

14. The system of claim 1, wherein determining to pair the first user and the second user is based at least in part on preferences of the first user.

15. The system of claim 1, wherein determining to pair the first user and the second user comprises analyzing an interaction history between the first user and the second user.

16. The system of claim 1, wherein determining to pair the first user and the second user comprises analyzing an interaction history between the first user and one or more features of the system.

17. The system of claim 1, wherein:

the interface is further configured to:

transmit a first prompt to the first user and the second user;

receive a first response from the first user in response to the first prompt;

receive a second response from the second user in response to the first prompt; and the processor is further configured to in response to receiving the first response from the first user and the second response from the second user, determine to pair the first user and the second user; and the interface is further configured to display the first response and the second response to the first user and the second user.

18. A method comprising:

determining, by a processor, that a first user takes a first action with respect to an interaction-based recommendation tool;

extracting, by the processor, a first set of features from a preference history of the first user, the first set of features indicating preferences of the first user with respect to other users;

extracting, by the processor, a second set of features from a preference history of a second user, the second set of features indicating preferences of the second user with respect to other users;

determining, by the processor, to pair the first user and the second user based at least on the first action, the first set of features, and the second set of features;

pairing, by the processor, the first user and the second user for an interaction, the interaction lasting for a first time period, the interaction is concurrent for the first user and the second user;

determining an interaction history related to the interaction;

receiving at a second time, by an interface, an indication of a preference of the first user for the second user, the second time being after the first time period, the indication is one of user ratings;

extracting a machine learning feature from the indication, the machine learning feature indicating a compatibility score between the first user and the second user learned from the interaction between the first user and the second user;

updating, by the processor, a machine learning pairing algorithm based at least on the indication weighted by the machine learning feature, the machine learning pairing algorithm being configured to generate pairs of users based at least on user profiles and user ratings in response to interactions with other users of the interaction-based recommendation tool; and determining, by executing the updated machine learning pairing algorithm, to pair the first user with a third user based at least on a second compatibility score between the first user and the third user, that is determined from a first profile of the first user, a second profile of the third user, and the interaction history.

19. The method of claim 18, further comprising, in a first iteration, training the machine learning pairing algorithm to provide a first probability for compatibility between the first user and the second user based at least on a first user profile of the first user and a second user profile of the second user, wherein updating the machine learning pairing algorithm is performed after the first iteration.

20. The method of claim 18, further comprising dynamically determining when to end the interaction based at least on tracking messages exchanged between the first user and the second user during the interaction, such that as a new message is exchanged between the first user and the second user during the interaction, a duration of the interaction is increased.

21. The method of claim 18, further comprising preventing communication between the first user and the second user at the end of the interaction.

22. The method of claim 18, further comprising assigning a weight to the received indication based at least on the interaction, wherein updating the machine learning pairing algorithm is further based at least on the assigned weight.

23. The method of claim 18, further comprising in a second iteration, training the machine learning pairing algorithm to provide a second probability for compatibility between the first user and the second user based at least on the interaction history, the assigned weight to the received indication, and the user profiles.

24. The method of claim 18, wherein executing the updated machine learning pairing algorithm is in response to the interactions of users of the interaction-based recommendation tool.

25. The method of claim 18, wherein the first action comprises the first user requesting to begin an interaction with a user.

26. The method of claim 18, wherein the first action comprises the first user indicating availability to begin the interaction with a user.

27. The method of claim 18, wherein the first action comprises the first user registering.

28. The method of claim 18, wherein the interaction comprises at least one message transmitted from the first user to the second user.

29. The method of claim 18, further comprising:

setting, by the processor, a timer for a fixed time;

determining, by the processor, that a message is transmitted between the first user and the second user; and in response to determining that the message is transmitted between the first user and the second user, updating, by the processor, the timer.

30. The method of claim 18, further comprising:

determining, by the processor, to pair a third user with the first user and the second user; and pairing, by the processor, the first user, the second user, and the third user for the interaction.

31. The method of claim 18, wherein determining to pair the first user and the second user is based at least in part on preferences of the first user.

32. The method of claim 18, wherein determining to pair the first user and the second user comprises analyzing an interaction history between the first user and the second user.

33. The method of claim 18, wherein determining to pair the first user and the second user comprises analyzing an interaction history between the first user and one or more features of a system.

34. The method of claim 18, further comprising:

transmitting, by the interface, a first prompt to the first user and the second user;

receiving, by the interface, a first response from the first user in response to the first prompt;

receiving, by the interface, a second response from the second user in response to the first prompt;

in response to receiving the first response from the first user and the second response from the second user, determining, by the processor, to pair the first user and the second user; and displaying, by the interface, the first response and the second response to the first user and the second user.

35. At least one non-transitory computer-readable medium comprising a plurality of instructions that, when executed by at least one processor, are configured to:

determine that a first user takes a first action with respect to an interaction-based recommendation tool;

extract a first set of features from a preference history of the first user, the first set of features indicating preferences of the first user with respect to other users;

extract a second set of features from a preference history of a second user, the second set of features indicating preferences of the second user with respect to other users;

determine to pair the first user and the second user based at least on the first action, the first set of features, and the second set of features;

pair the first user and the second user for an interaction, the interaction lasting for a first time period, the interaction is concurrent for the first user and the second user;

determine an interaction history related to the interaction;

receive, at a second time, an indication of preference of the first user for the second user, the second time being after the first time period, the indication is one of the user ratings;

extract a machine learning feature from the indication, the machine learning feature indicating a compatibility score between the first user and the second user learned from the interaction between the first user and the second user;

update a machine learning pairing algorithm based at least on the indication weighted by the machine learning feature, the machine learning pairing algorithm being configured to generate pairs of users based at least on user profiles and user ratings in response to interactions with other users of the interaction-based recommendation tool; and determine, by executing the updated machine learning pairing algorithm, to pair the first user with a third user based at least on a second compatibility score between the first user and the third user, that is determined from a first profile of the first user, a second profile of the third user, and the interaction history.

36. The at least one non-transitory computer-readable medium of claim 35, wherein the instructions are further configured to, in a first iteration, train the machine learning pairing algorithm to provide a first probability for compatibility between the first user and the second user based at least on a first user profile of the first user and a second user profile of the second user, wherein updating the machine learning pairing algorithm is performed after the first iteration.

37. The at least one non-transitory computer-readable medium of claim 35, wherein the instructions are further configured to dynamically determine when to end the interaction based at least on tracking messages exchanged between the first user and the second user during the interaction, such that as a new message is exchanged between the first user and the second user during the interaction, a duration of the interaction is increased.

38. The at least one non-transitory computer-readable medium of claim 35, wherein the instructions are further configured to prevent communication between the first user and the second user at the end of the interaction.

39. The at least one non-transitory computer-readable medium of claim 35, wherein the instructions are further configured to assign a weight to the received indication based at least on the interaction, wherein updating the machine learning pairing algorithm is further based at least on the assigned weight.

40. The at least one non-transitory computer-readable medium of claim 35, wherein the instructions are further configured to, in a second iteration, train the machine learning pairing algorithm to provide a second probability for compatibility between the first user and the second user based at least on the interaction history, the assigned weight to the received indication, and the user profiles.

41. The at least one non-transitory computer-readable medium of claim 35, wherein executing the updated machine learning pairing algorithm is in response to the interactions of users of the interaction-based recommendation tool.

42. The at least one non-transitory computer-readable medium of claim 35, wherein the first action comprises the first user requesting to begin the interaction with a user.

43. The at least one non-transitory computer-readable medium of claim 35, wherein the first action comprises the first user indicating availability to begin the interaction with a user.

44. The at least one non-transitory computer-readable medium of claim 35, wherein the first action comprises the first user registering.

45. The at least one non-transitory computer-readable medium of claim 35, wherein the interaction comprises at least one message transmitted from the first user to the second user.

46. The at least one non-transitory computer-readable medium of claim 35, wherein the instructions are further configured to:

set a timer for a fixed time;

determine that a message is transmitted between the first user and the second user; and in response to determining that the message is transmitted between the first user and the second user, update the timer.

47. The at least one non-transitory computer-readable medium of claim 35, wherein the instructions are further configured to:

determine to pair a third user with the first user and the second user; and pair the first user, the second user, and the third user for the interaction.

48. The at least one non-transitory computer-readable medium of claim 35, wherein determining to pair the first user and the second user is based at least in part on preferences of the first user.

49. The at least one non-transitory computer-readable medium of claim 35, wherein determining to pair the first user and the second user comprises analyzing an interaction history between the first user and the second user.

50. The at least one non-transitory computer-readable medium of claim 35, wherein determining to pair the first user and the second user comprises analyzing an interaction history between the first user and one or more features of a system.

51. The at least one non-transitory computer-readable medium of claim 35, wherein the instructions are further configured to:

transmit a first prompt to the first user and the second user;

receive a first response from the first user in response to the first prompt;

receive a second response from the second user in response to the first prompt;

in response to receiving the first response from the first user and the second response from the second user, determine to pair the first user and the second user; and display the first response and the second response to the first user and the second user.

* * * * *